United States Patent [19]

Becker

[11] 4,037,073

[45] July 19, 1977

[54] RESISTANCE WELDING OF SHEET METAL COATED WITH LAYERS

[76] Inventor: Otto Alfred Becker, 59 Robert-Koch-Strasse, 66 Saarbrucken 6, Germany

[21] Appl. No.: 491,857

[22] Filed: July 25, 1974

Related U.S. Application Data

[62] Division of Ser. No. 102,950, Dec. 30, 1970, Pat. No. 3,897,593, which is a division of Ser. No. 704,684, Feb. 12, 1968, Pat. No. 3,643,057.

[30] Foreign Application Priority Data

| Feb. 11, 1967 | Germany | 91162 |
| May 26, 1967 | Germany | 92707 |
| Apr. 24, 1967 | Germany | 92210 |
| Feb. 27, 1967 | Germany | 91404 |

[51] Int. Cl.² .............................................. B23K 11/10
[52] U.S. Cl. .................................................... 219/92
[58] Field of Search .................... 219/91, 92, 93, 94

[56] References Cited

U.S. PATENT DOCUMENTS

| 3,067,488 | 12/1962 | Bennett et al. | 219/92 X |
| 3,155,809 | 11/1964 | Griswold | 219/93 X |
| 3,156,514 | 11/1964 | Wing et al. | 219/92 X |
| 3,337,711 | 8/1967 | Garscia | 219/92 |
| 3,418,444 | 12/1968 | Ruehlemann | 219/113 |
| 3,489,446 | 1/1970 | Williams | 219/91 X |
| 3,538,293 | 11/1970 | Procacino | 219/86 |
| 3,559,285 | 2/1971 | Kauffman | 29/630 |

FOREIGN PATENT DOCUMENTS

| 697,396 | 9/1953 | United Kingdom | 219/92 |

Primary Examiner—Bruce A. Reynolds
Attorney, Agent, or Firm—Erich M.H. Radde

[57] ABSTRACT

The invention relates to a method for the resistance welding of sheet metal coated with layers, wherein firstly electrical contact is established between the sheets to be interwelded and between the welding electrodes and said sheets, and subsequently welding is effected across the coating layers. The invention relates also to machines for carrying out this method.

5 Claims, 51 Drawing Figures

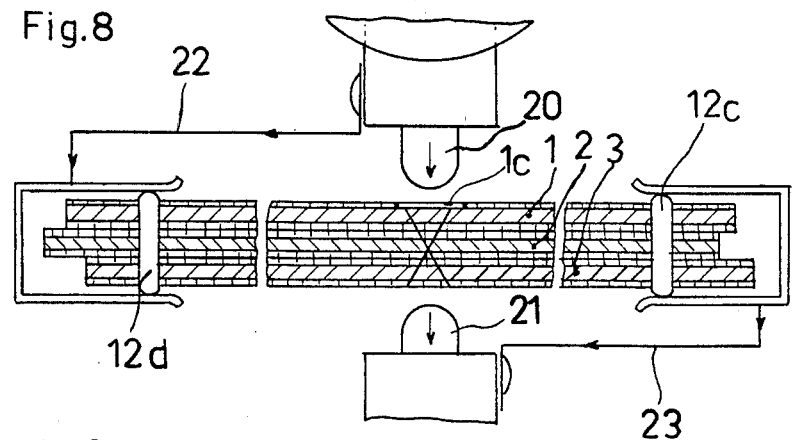
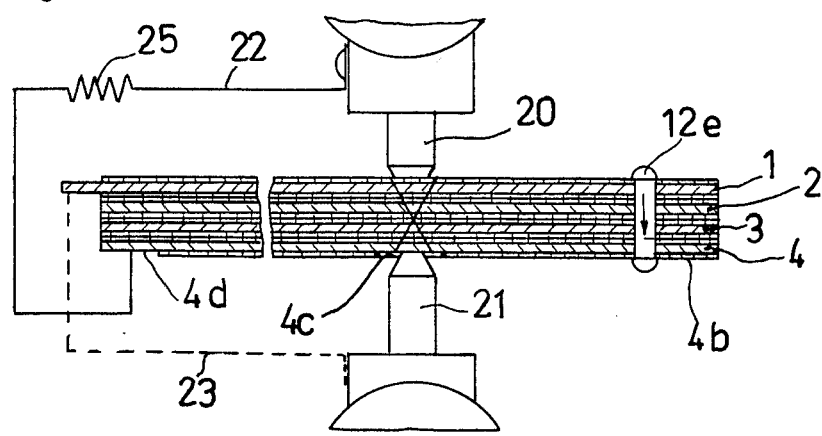
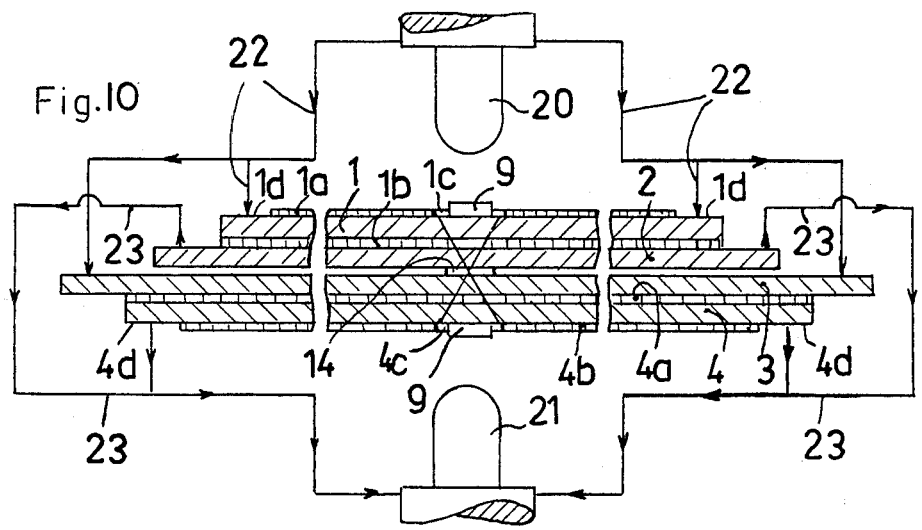

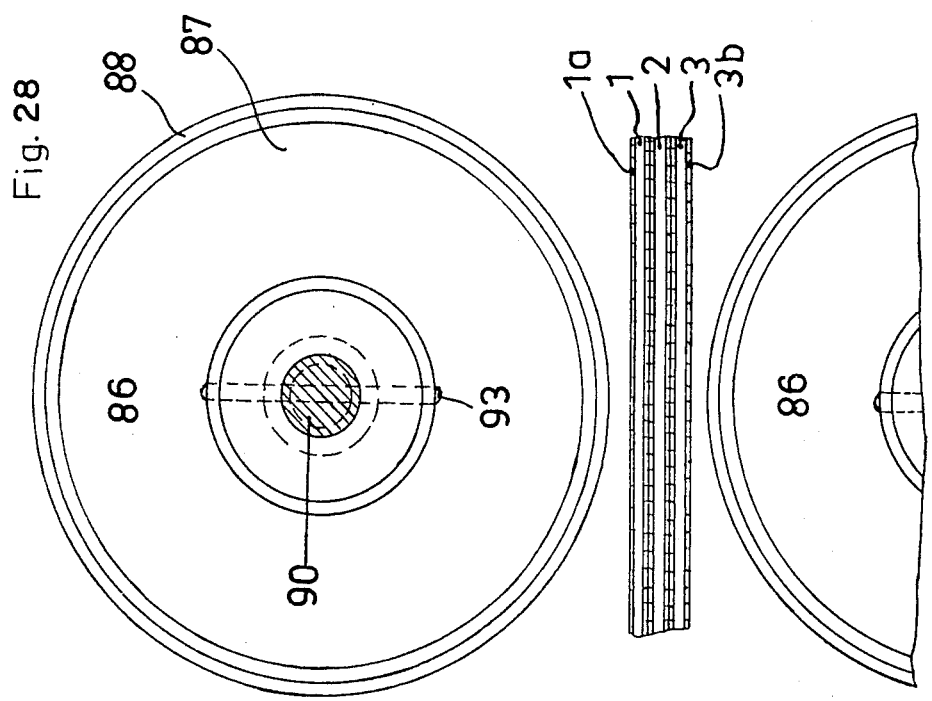
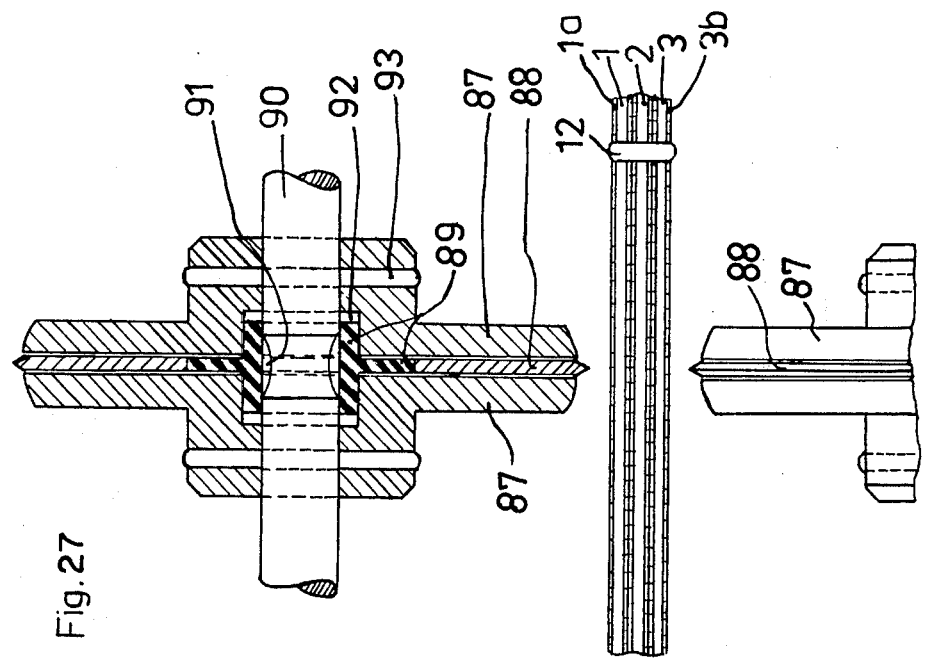

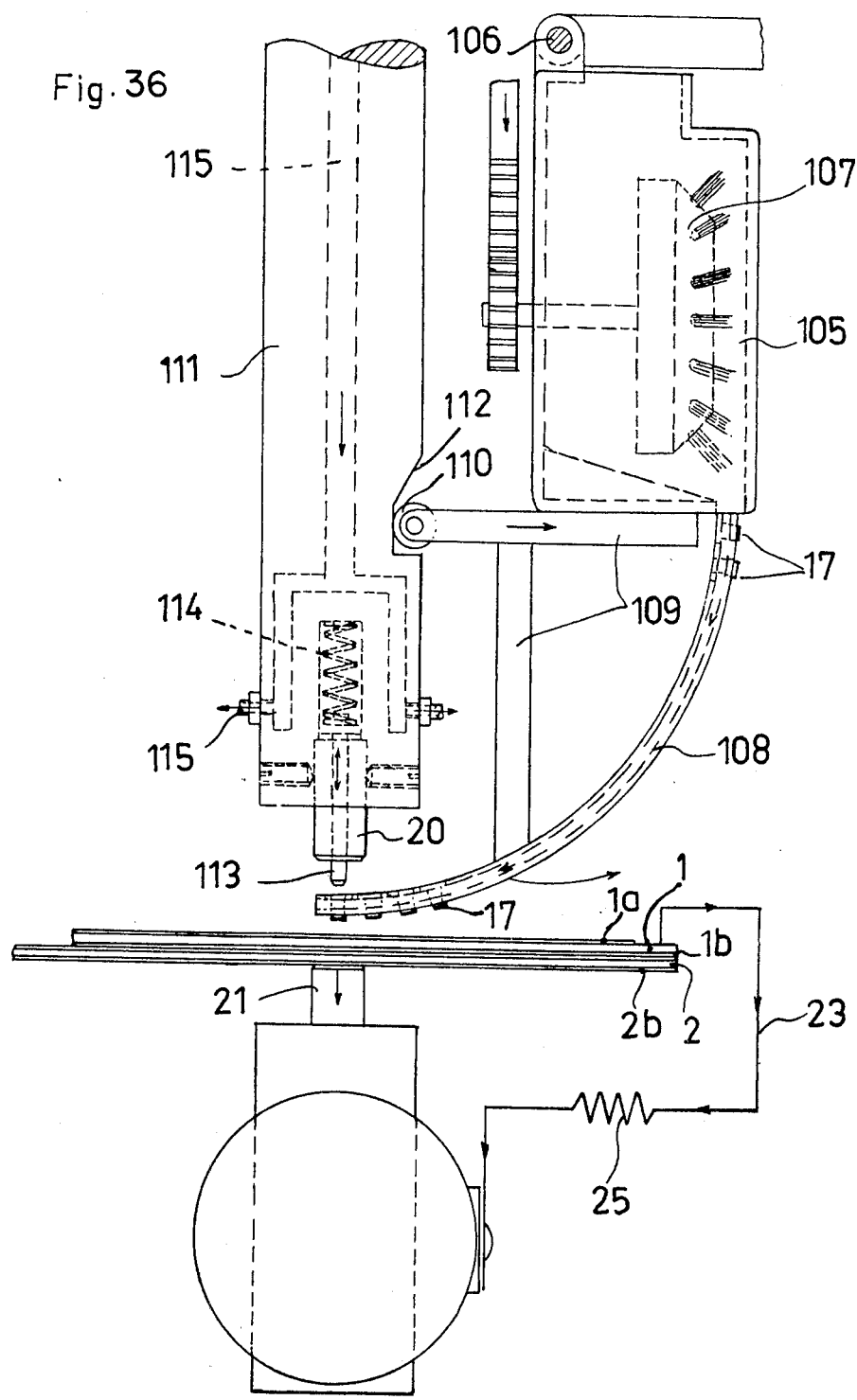

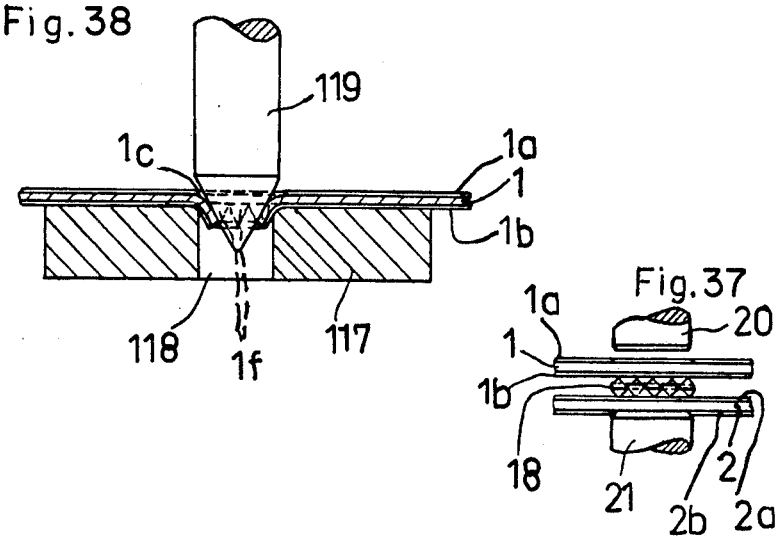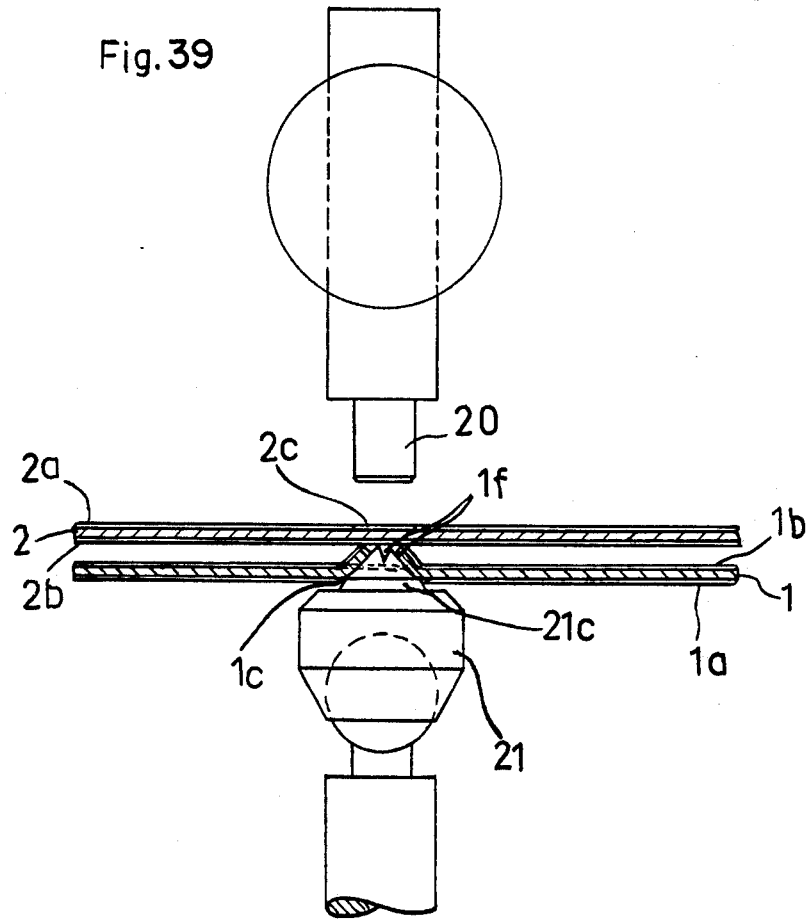

RESISTANCE WELDING OF SHEET METAL COATED WITH LAYERS

This is a division of U.S. application Ser. No. 102,950, filed Dec. 30, 1970, now U.S. Pat. No. 3,897,593, issued July 29, 1975, which in turn is a divisional application of U.S. application Ser. No. 704,684, filed Feb. 12, 1968, now U.S. Pat. No. 3,643,057, issued Feb. 15, 1972.

The present invention relates to the resistance-welding of sheet metal coated with layers, and to machines for performing this welding.

Sheet metal coated with synthetic material is desirable because its rust-free insensitive surface can be produced in many patterns and colours; however, such sheet metal cannot be connected in the usual way by spot- or roller seam-welding to other sheet metal or components of a different kind. According to a prior patent of Applicant the sheet metal panels are stripped of their coating layers in the areas to be interwelded in such a manner that electrical contact is established when the sheet metal panels are pressed against each other. With comparatively thick synthetic layers and even with comparatively thick sheet metal the recesses formed by the stripping may be filled with inserted intermediate welding pieces. Thus, with the usual welding machines faultless welded connections can be made of sheet meals consisting of steel, chromium-nickel-steel, aluminium or other metal coated with layers of synthetic material, lacquer or other insulating materials.

Since in the areas to be interwelded the layers on the upper and under-side of each sheet metal panel had to be removed, there exists the problem of reducing the number of strippings and even to dispense with stripping altogether.

In accordance with the present invention firstly electrical contact is established between the sheet metal panels to be interwelded and between the electrodes and the sheet metal panels, and subsequently the welding is performed across the coating layers. This contact may be an auxiliary contact electrically connecting the sheet metal panels with each other outside the areas to be interwelded and allowing a current to flow between the electrodes via the sheet metal panels and the auxiliary contact. The current heats the sheet metal panels, melts or destroys the coating layers in the areas to be interwelded, whereafter welding is performed under the pressure of the electrodes. The auxiliary contact may be formed by a welded spot, a rivet or pin connecting the sheet metal panels, a U-shaped piece of sheet metal or a clamping tong.

The contact may be established by one or more shunts leading from the electrodes to the sheet metal panels and establishing a flow of current through the sheet metal panels for melting the layers. When interwelding three or more superimposed sheet metal panels the same may be connected by auxiliary contacts for establishing a zig-zag-shaped or parallel flow of current through their metal sheets. Regulating resistors built into the shunts serve for adjusting the currents flowing through the shunts relative to each other.

In order to avoid stripping off the outer layers, wires may be pressed-in between the electrodes and outer layers, which are connected to the opposite electrodes, by means of which the wires after the softening of the layers are pressed on the sheet metal and interwelded with it. These wires may consist of low melting point metal and, when melting, they destory the layers.

The contact may alternatively be formed by a contact tube, which is insulated from the electrode and placed together with the latter on the sheet metal, while being connected to the opposite electrode. The current flowing from the electrode to the contact tube warms the sheet metal until the underlying layers are melted and the welding is performed.

Moreover two or three electrodes carrying different currents may be arranged side-by-side on the sheet metal panels, between which electrodes there flows firstly a current for softening the layers until contact is established with the opposite electrodes. The same effect can be attained with a double-point electrode placed on the upper- or under-side of the sheet metal panels.

Contact could be established also by means of cutting edges, points, teeth or the like, which penetrate through the layers. For example one electrode may be provided with an annular cutting edge. Cutter blades may be mounted pivotally on a clamping tong and connected to a shunt. A spring-loaded thrust pin mounted in the electrode may penetrate the layer. When performing a roller seam-welding operation, a resiliently mounted cutter disc may be arranged between the halves of a welding roller. The piercing of the layers may be effected by means of press-in bodies having points, teeth or the like, which are placed on the area to be welded, establish contact when pressed in by the electrode, and are then interwelded. For mechanical treatment, inserting devices or belts with inserted press-in bodies are provided. For layers between consecutive sheet metal panels, press-in bodies with teeth pointing upward and downward are provided. These teeth may alternatively be formed of the metal sheets to be interwelded e.g., by impressing a point in the area to be welded.

For dispensing with stripping of the outer layers the heating may be effected by heating elements co-axially surrounding the electrode or housed in a cavity of the electrode.

For the same purpose a hot air device may be arranged in or around the electrode, and for saving the surrounding coating layer cooling plates may be placed on it. A hot air device facilitates also roller seam-welding with contact cutting discs.

When performing the roller seam-welding with simple welding rollers, contact may be established by press-in wires placed on top, in conjunction with a hot air device.

A hot air device may be dispensed with, particularly when wires of low melting point metal connected by shunts to the electrodes are placed on the coating layers. For the interwelding of two sheet metal panels coated with layers on both sides there suffices one wire on the top surface, while the underside does not require such wire or stripping off of the layer. Alternatively a wire may be interposed between the sheet metal panels, which is connected to the electrodes and is interwelded with the sheet metal in the operation.

The various methods, the device and machines required for carrying them out will be now described by way of example with reference to the accompanying drawings, in which:

FIGS. 1 – 21 show a first group, wherein the coating layers are melted or destroyed in the area to be welded by the electrode current, namely according to:

FIG. 1 by conducting the current over an auxiliary contact: in the form of a welded spot, for sheet metal panels coated with layers on both sides;

FIG. 2 in the form of a contact pin of three sheet metal panels with two inner layers;

FIG. 3 in the form of a U-shaped piece of sheet metal with a synthetic layer lying in the U-bend;

FIG. 4 by conducting shunt currents into the metal sheets and forming contacts by welding pieces inserted between two sheet metal panels coated outside;

FIG. 5 by conducting a shunt current into a metal sheet contacted by an opposite electrode, for two sheet metal panels coated on both sides;

FIG. 6 by conducting shunt currents into the uppermost and into the lowermost metal sheet and conducting the current on a zig-zag path by the aid of auxiliary contacts, for two sheet metal panels coated on both sides and one uncoated sheet metal panel;

FIG. 7 shows a modification of FIG. 6 for three sheet metal panels all coated on both sides;

FIG. 8 by conducting shunt currents in parallel through auxiliary contacts into all of the metal sheets;

FIG. 9 by conducting a current into the sheet metal panel contacted by the opposite electrode and by an auxiliary contact for all of the sheet metal panels with a regulating resistor connected in the shunt;

FIG. 10 by conducting shunt currents into several sheet metal panels, and by a welding piece as the auxiliary contact for two sound damping sheet metal panels, which are coated on one side each;

FIG. 11 by conducting shunt currents into two sound-damping sheet metal panels contacting a spacer;

FIG. 12 by conducting shunt currents into several sheet metal panels, the sheet metal panel contacted by the electrode being connected to the opposite electrode;

FIG. 13 by conducting shunt currents into the sheet metal panels and into a press-in or welding wire placed on the outer layers, for three sheet metal panels, all coated on both sides;

FIG. 14 showing a carrier and transport belt for the press-in wire;

FIGS. 15, 16 by contact tubes mounted on the electrodes and connected by shunts to the opposite electrodes, in part-sectional elevation and plan view, respectively;

FIG. 17 showing a modification thereof, the contact tubes of opposite electrodes being connected to each other by a shunt;

FIG. 18 by arranging two pairs of insulated auxiliary electrodes connected to the opposite electrode by shunt lines;

FIG. 19 showing a modification thereof, the auxilariy electrodes being formed by welding tongs;

FIG. 20 by arranging a pair of insulated auxiliary electrodes connected by a shunt line;

FIG. 21 by arranging a first double-point electrode above, and a second double-point electrode as an opposite electrode below a packet of sheet metal panels;

FIGS. 22 – 39 show a second group of arrangements for piercing or cutting through the coating layers, namely;

FIG. 22 by arranging a cutting edge on the tip of the electrode, which is surrounded by a protective hood filled with protective gas;

FIG. 23 by arranging blades on a clamping tong and connecting shunt lines to it, shown in the closed position in side elevation;

FIG. 24 showing part of FIG. 23 in the open position;

FIG. 25 showing a jaw of FIGS. 23, 24 in front elevation;

FIG. 26 by the arrangement of a thrust pin in the electrode;

FIGS. 27, 28 by the arrangement of a cutter disc between the halves of a welding roller, in longitudinal section and end view, respectively;

FIG. 29 by press-in bodies with teeth inserted between the electrodes and layers, in section;

FIG. 36 shows an automatic supply of press-in bodies by means of a pivotable supply chute, in side elevation;

FIG. 37 shows a press-in body for intermediate layers in the form of a ring having upwardly and downwardly directed teeth, in side elevation;

FIG. 38 shows the production of a crown of teeth from the coated sheet metal itself, in section;

FIG. 39 shows interwelding with a sheet metal coated on both sides, in section;

Figure 40:
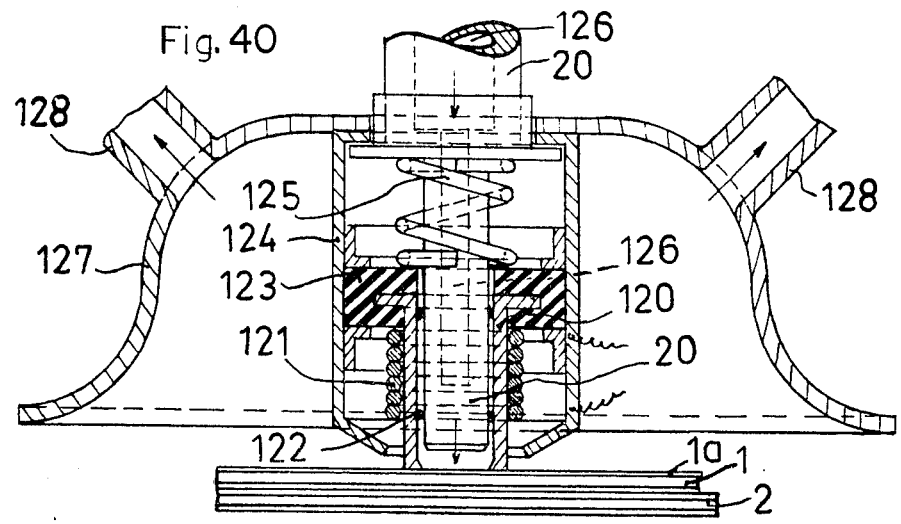
FIGS. 40 – 51 show a third group with heating by means of heater elements, hot air or fuse wires, as well as combinations thereof with the preceding groups, namely.
Figure 41:
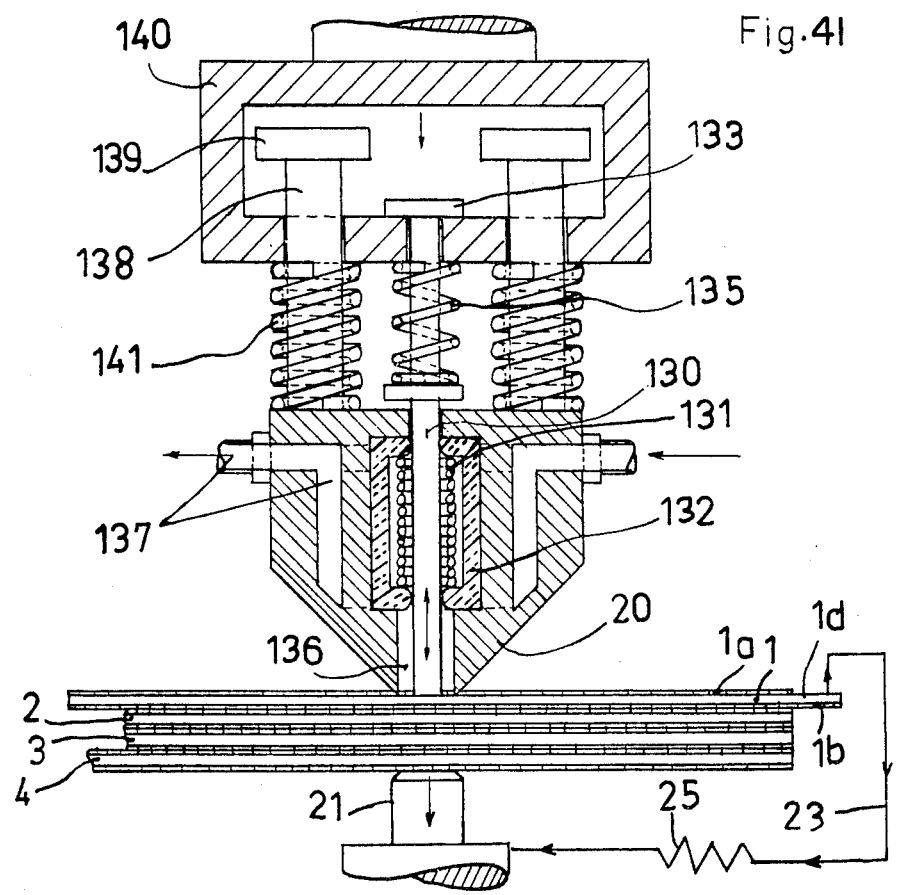
Figure 42:
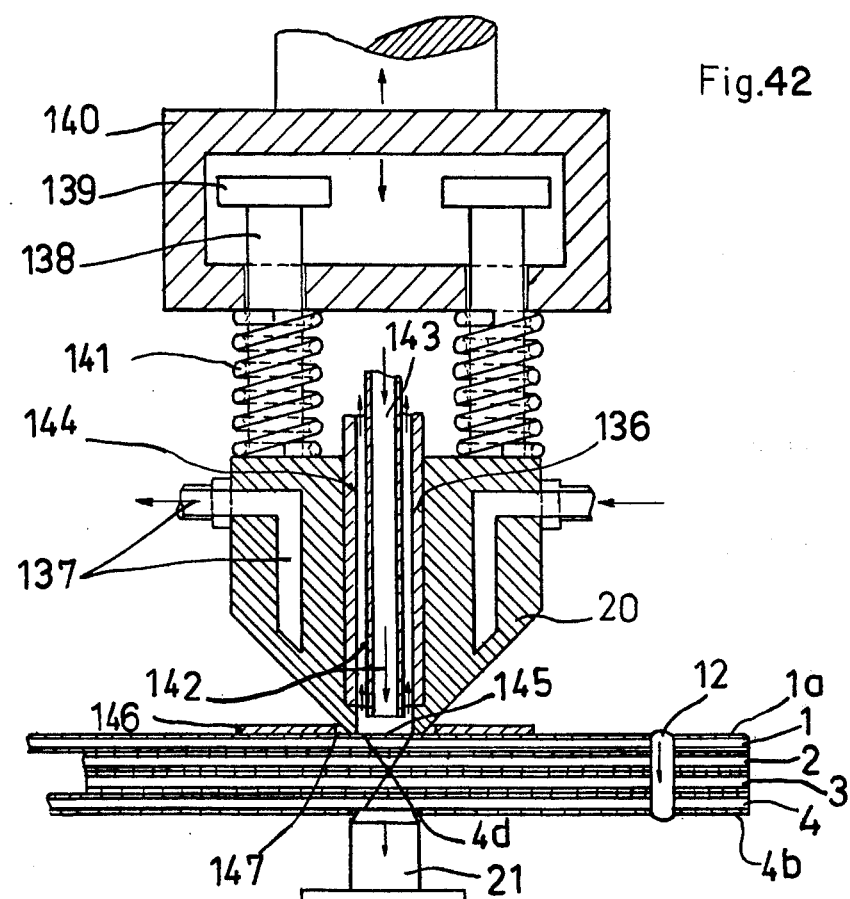
Figure 43:
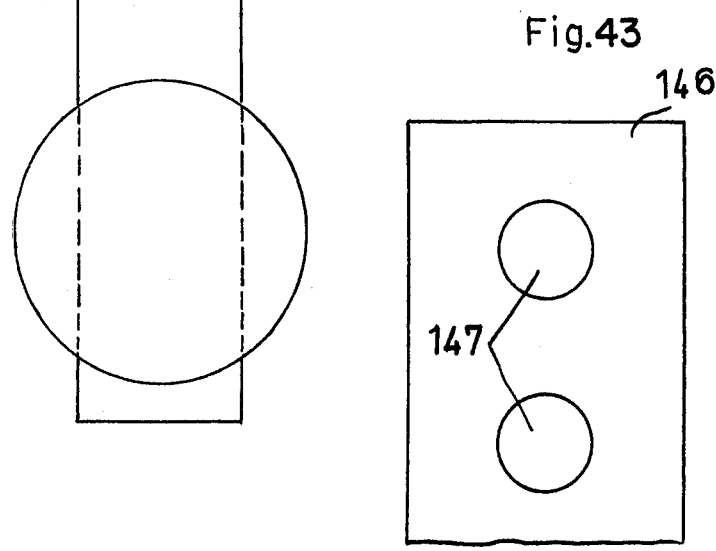
Figure 44:
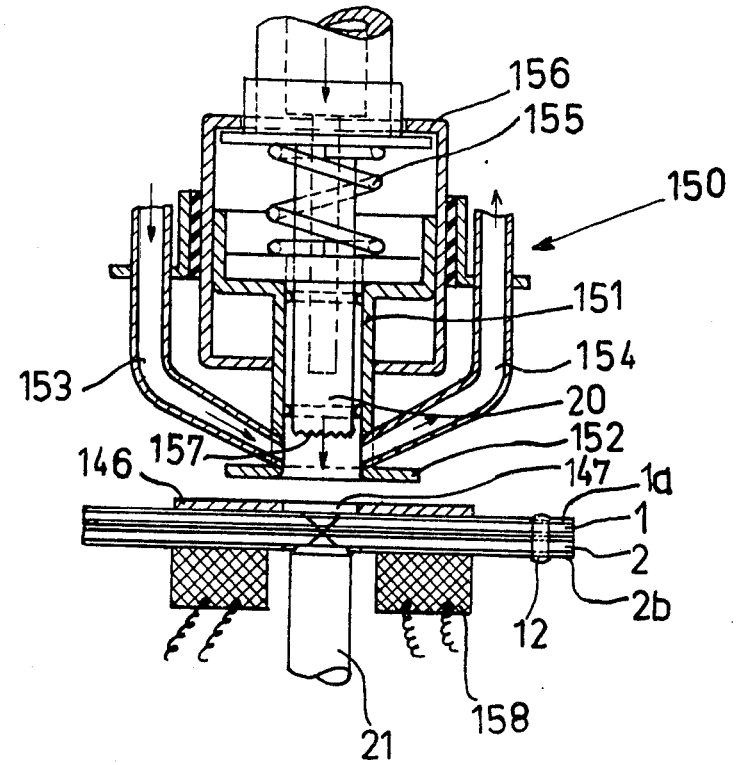
Figure 45:
Figure 47:
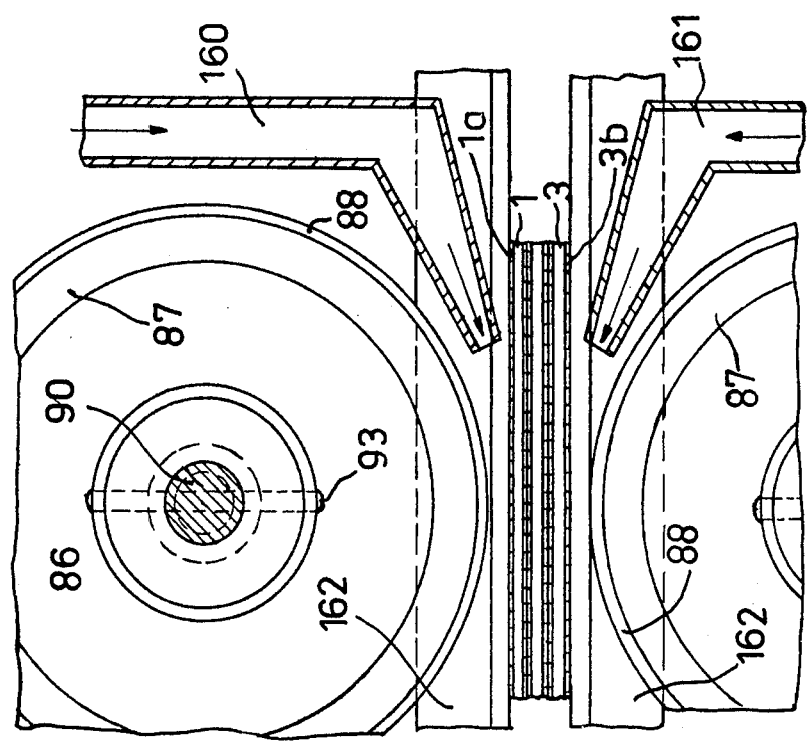
Figure 46:
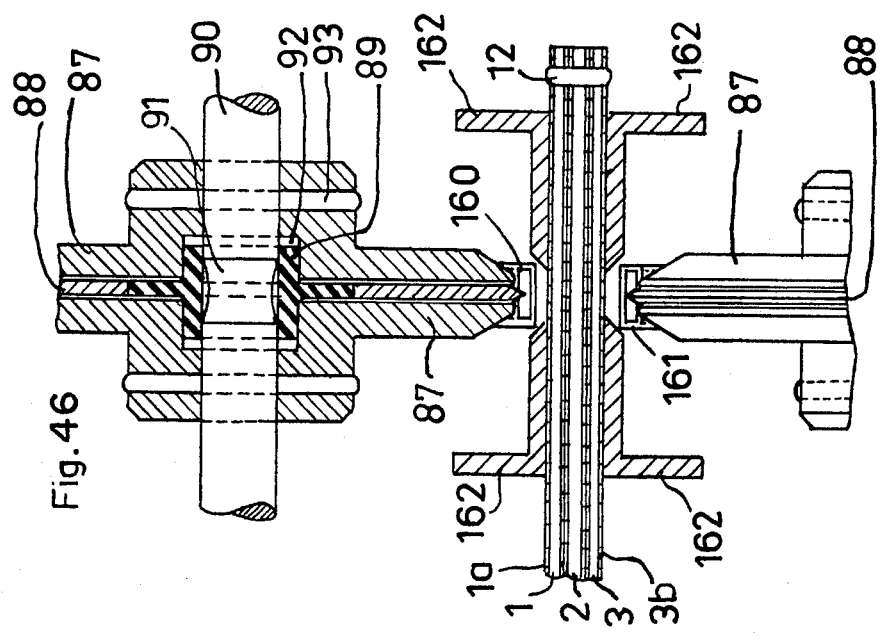
Figure 48:
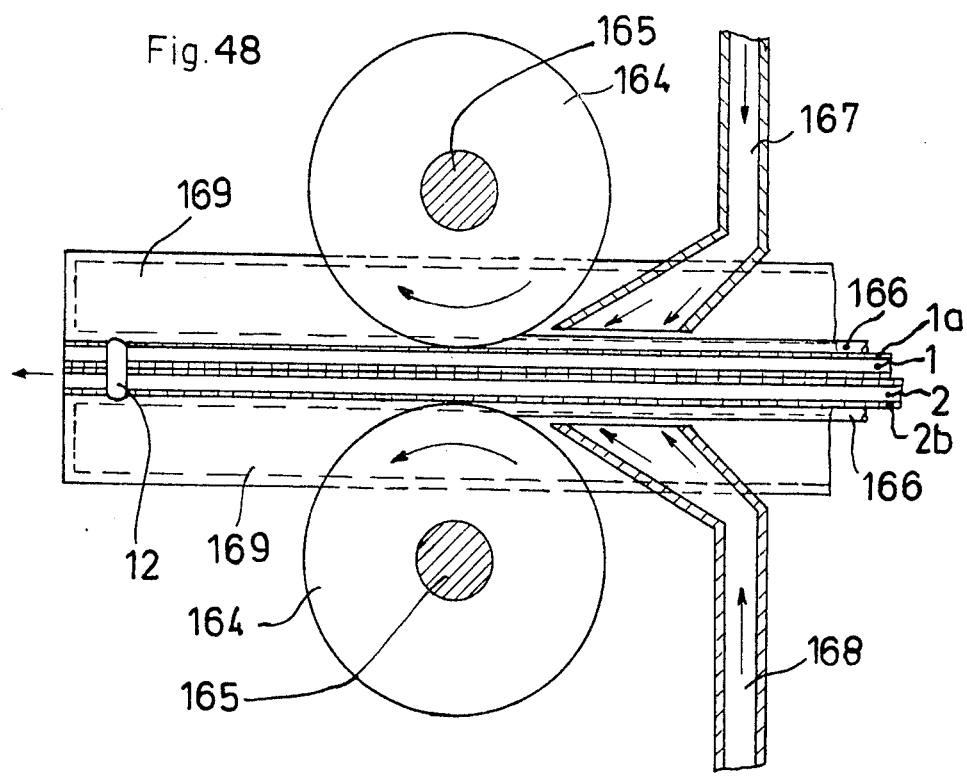
Figure 49:
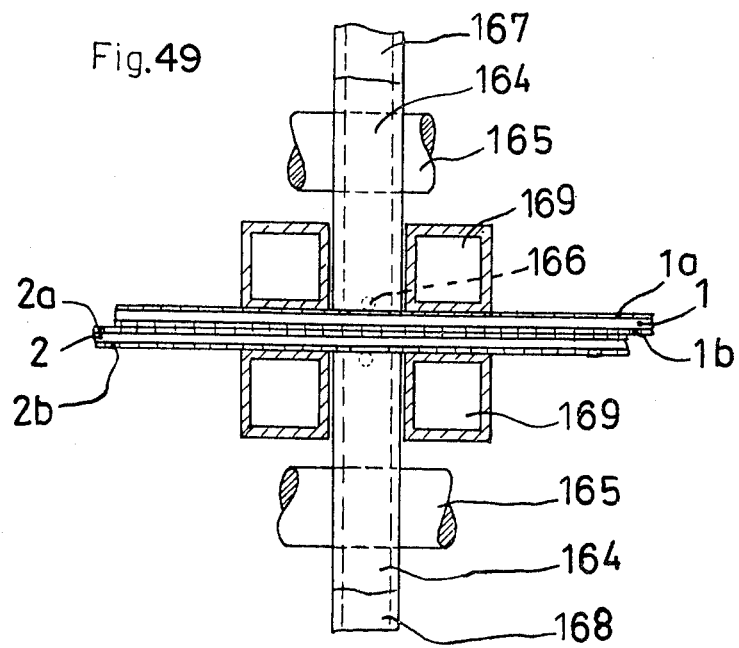
Figure 50:
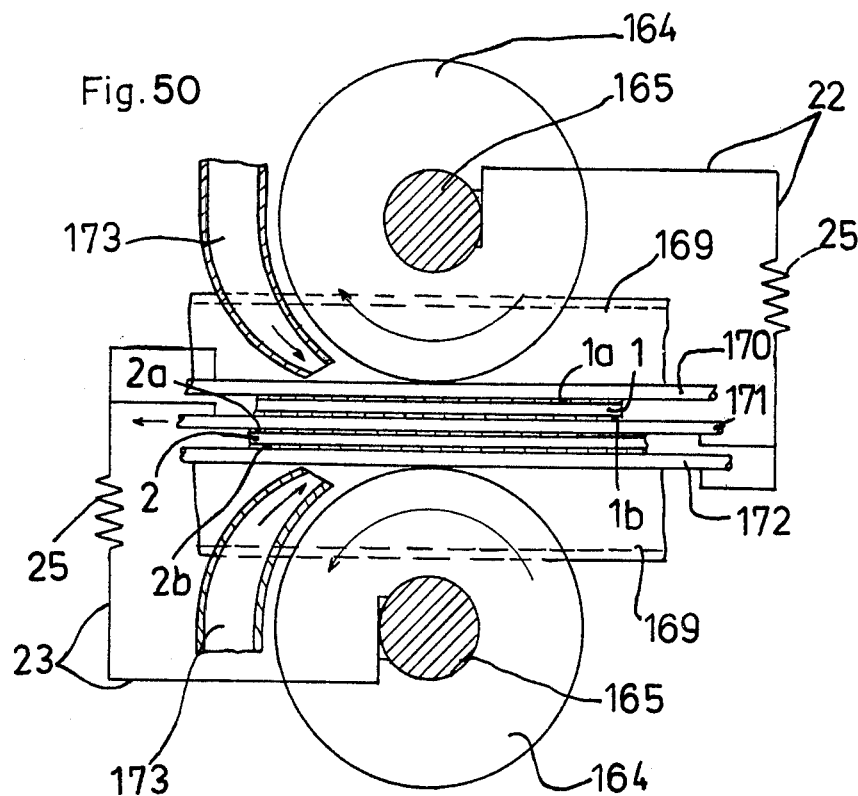
Figure 51:
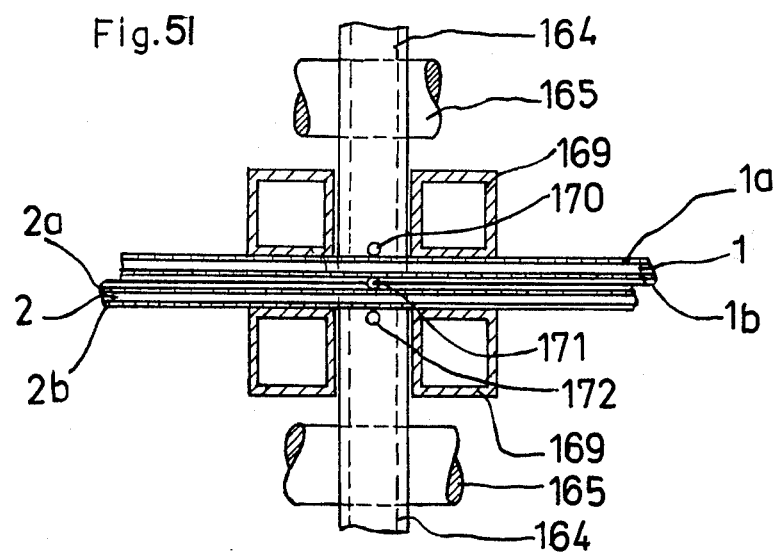

FIG. 40 by a tubular heater stamp surrounding the electrode, with a suction hood for the gases produced, in section;

FIG. 41 by a pin-shaped heater stamp arranged in the electrode, in section;

FIG. 42 by a hot air device, arranged in a central bore of the electrode, in section;

FIG. 43 shows a cooling plate in plan view;

FIG. 44 by a hot air device arranged externally around the electrode, in section;

FIG. 45 shows an electrode with cutter serrations in plan view from below;

FIGS. 46, 47 by a hot air device for welding rollers with cutter discs, in section and end view, respectively;

FIGS. 48, 49 by a hot air device for welding rollers and press-in wires, in section side- and front elevations, respectively;

FIGS. 50, 51 by interposed fuse wires connected to shunts for roller seam-welding under protective gas, prior to welding in sectional side elevation, and during welding in sectional front elevation, respectively.

Figure 1:
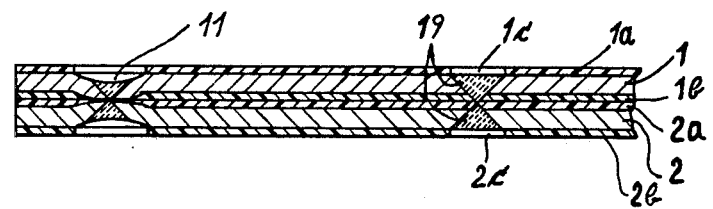

In FIG. 1 a sheet metal 1 is illustrated, which has an upper layer 1a and a lower layer 1b and is to be connected by spot-welding to a second sheet metal 2 having layers 2a, 2b. For this purpose firstly contact is established between the metal sheets 1, 2 e.g., by means of a weld spot 11 (left hand side), which may be produced in accordance with a prior patent of the Applicant by removing all layers on the area to be welded. For producing further weld spots the external layers only are stripped at 1c, 1d. When applying the electrodes to the next weld spot 19, current flows firstly from the upper electrode through the existing weld spot 11 to the lower electrode; the metal sheets are heated; the layers lying at the zone to be welded melt; the metal sheets contact each other under the pressure of the electrodes and are interwelded. After establishing a single weld spot by external and internal stripping of layers, all remaining spots 19 can be welded after external stripping only, and internal stripping of layers may be dispensed with.

Figure 2:
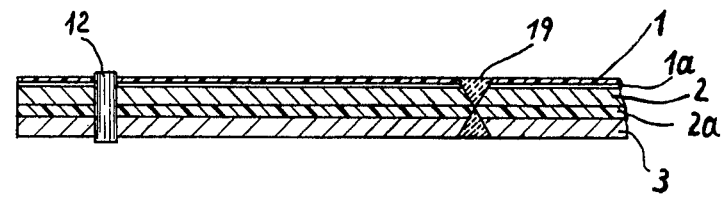

In FIG. 2 a thin sheet of chromium-nickel-steel 1 is connected by a cement layer 1a to a first steel sheet 2, and through sound-damping layer 2a to a second steel sheet 3. After firstly electrical contact is established e.g., by a pin 12 knocked into a bore through the three metallic layers 1, 2, 3, spot-welds 19 may be produced on any points desired without having to remove the cement layer and the sound-damping layer.

Figure 3:
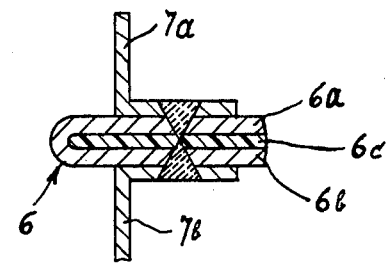

A further possible way of establishing contact is shown in FIG. 3. A sheet metal piece 6, which is doubled back upon itself and includes between its upper leg 6a and lower leg 6b a synthetic foil 6c, is to be connected to an upper angle piece 7a and to a lower angle piece 7b. When applying the electrodes, current flows through the bend of the sheet metal piece 6, and melts the synthetic layer 6c, whereafter the interwelding of the four parts takes place.

Cements and foils between the sheet metal panels should as far as possible be free from all solvents. Otherwise explosive gases are generated which throw out the metal fused by the welding, whereby interwelding is prevented. When, however, the cement and the layers are free of solvents, merely melting phenomena occur, which seal the weld spot and protect it from corrosion. Layers lying between the sheet metal panels are hermetically sealed from the environment. Oxidation phenomena cannot therefore occur in the cemented gaps or foils when welding. Carbonising occurs, though, which however is not detrimental to the interwelding.

Other substances, too, such as paper or fabrics may be provided as intermediate layers, and the same are also destroyed merely where interwelding takes place.

Figure 4:
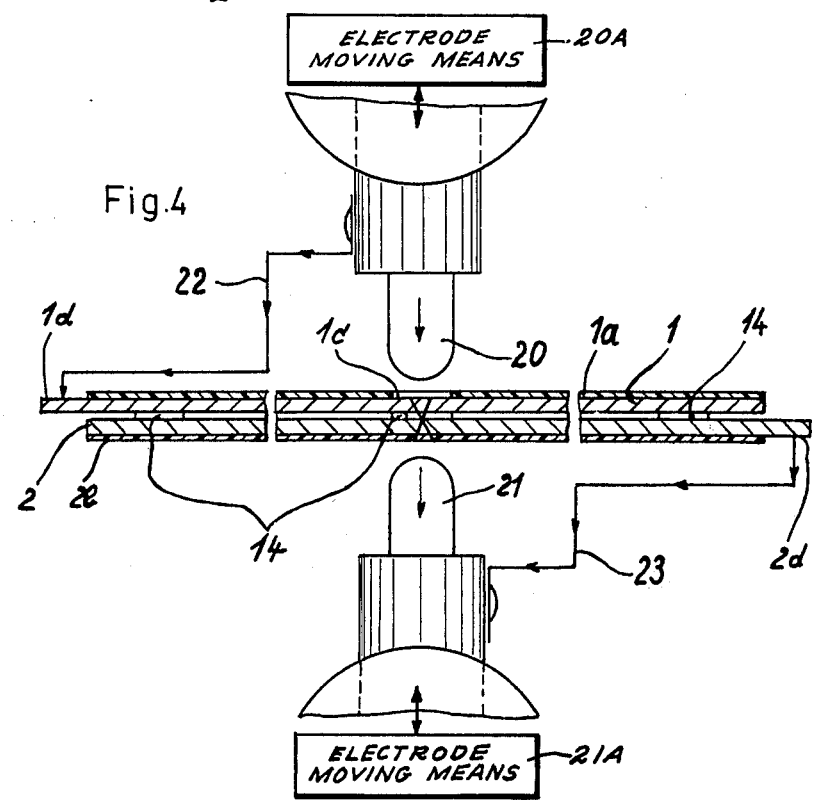

FIG. 4 shows a method for the interwelding of two sheet metal panels coated only externally with layers. One sheet metal panel 1 has on its external layer 1a a stripped area 1c for the first weld spot, and a stripped area 1d on the margin. A second sheet metal panel 2 with an outer layer 2b has a stripped zone 2d on the margin only, and is to be connected to the sheet metal panel 1. For this purpose, metallic welding pieces 14 are inserted between the blank inner surfaces of the sheet metal panels and are held in position by cementing or by magnetic forces.

The upper metal sheet 1 is connected by a shunt 22, e.g., a cable, to the upper electrode 20, while the lower metal sheet 2 is connected by a shunt 23 to the lower electrode 21 on the stripped zones 1d, 2d of the margins. When the electrodes are applied, through electrode moving means 20A and 21A, respectively, which are conventional and therefore schematically shown in FIG. 4, current flows from the upper electrode 20 into the metal sheet 1; through the welding pieces 14, in particular through the welding piece between the electrodes, into the metal sheet 2; and through the conductor 23 to the lower electrode 21. The inserted welding piece 14 forces the current to flow through the zone to be welded and to effect heating there owing to resistance reinforced by inductive action of the electrodes, which are firstly under electric potential difference only. Thereby the synthetic material of the lower layer 2b is melted on the lower electrode 21, whereby this electrode, too, is applied to the metal sheet and interwelding taken place perpendicular to the planes of the metal sheets across the insulating synthetic intermediate layers or the like, which are fused at that moment.

By the current flowing into the metal sheets from the shunts, the conditions are established, which are required for a direct interwelding perpendicular to the planes of the metal sheets by providing the external and internal contacts. The applied electrodes effect bunching of the flow of current, and thus produce the strongest heating immediately between the electrodes. All the remaining parts of the surface remain unaffected owing to being warmed but little. Only when a flow of current takes place between the electrodes, the heat is increased up to the melting point of the metals.

After the first welding by the aid of a single upper stripped zone 1c, further weld spots may be produced on the inserted welding pieces 14 without further stripping. The application of the shunt lines 22, 23 allows welding without having firstly on auxiliary contact point as according to FIGS. 1 – 3.

Figure 5:
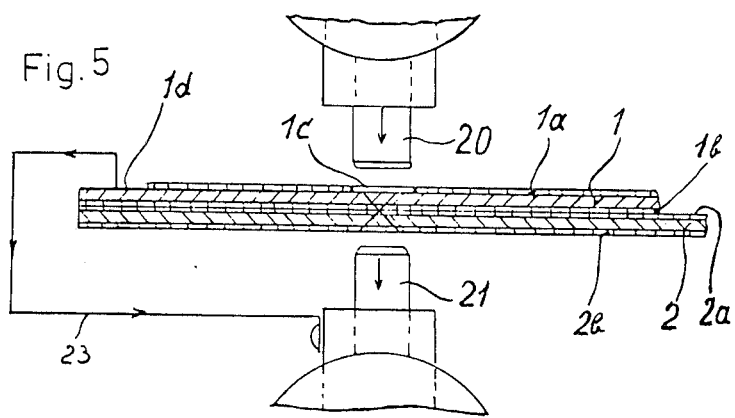

Even sheet metal panels coated with layers on both sides may be welded by the aid of shunts branched off from the electrodes, without requiring a contact points. FIG. 5 shows an upper sheet metal panel 1 having coating layers 1a, 1b, whose upper layer has a stripped area 1c on the intended weld spot, and a stripped area 1d on the margin for applying a lower shunt 23. The lower sheet metal 2 with coating layers 2a, b has no stripped zones.

After applying the electrodes and switching on the current, the same flows from the upper electrode 20 into the metal sheet 1; through the shunt 23 to the lower electrode 21; the metal sheet 1 is warmed up; the inner coating layers 1b, 2a and likewise the outer layer 2b melt; contact between the metal sheets and the electrodes is established and the welding is performed. Subsequently further weldings may be made on any places desired without any stripping of layers.

Direct current, alternating current of mains frequency or currents of higher frequency many be used. By the flow of the current against the resistance of the metal sheets the same are warmed up, particularly immediately below the upper electrode, whereby the mutually contacting insulating intermediate layers of synthetic materials, lacquer, paper, fabrics or the like are displaced, and the metal sheets come into contact with each other by the pressure of the electrodes. The heat of the upper metal sheet is transmitted at these places to the lower metal sheet, whereby also the lower insulating layer is melted, against which bears the lower electrode. By the pressure of the electrodes this melting layer is squeezed off, and thus contact is established between the two electrodes across the metal sheets, and interwelding is performed.

For assisting the welding operation, the sheet metal panels may be previously heated to a temperature adequate to the kind of coating material thereof.

For the interwelding of three or more superimposed coated sheet metal panels the methods using an auxiliary contact and shunts may be combined.

Figure 6:
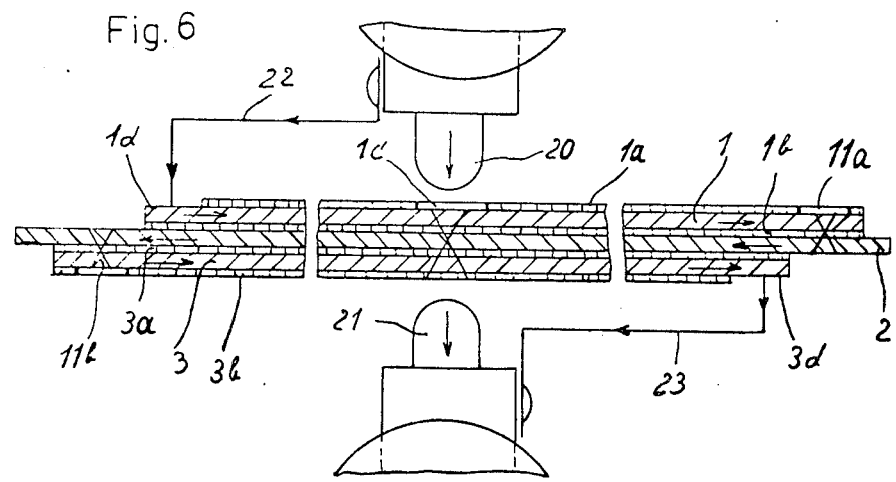

In accordance with FIG. 6, three sheet metal panels are to be connected to each other, namely an upper metal sheet 1, whose outer coating layer 1a has underneath the electrode a stripped area 1c, and on the margin a stripped area 1d for an upper shunt 22; a middle metal sheet 2 without coating layers, which on the right hand side is connected to the upper metal sheet 1 by an auxiliary contact 11a; and a lower metal sheet 3, whose outer coating layer 3b has a stripped zone 3d on the margin for a lower shunt 23, and on the left hand side an auxiliary contact 11b welded to sheet 2. By the provision of the auxiliary contacts 11a, 11b on opposite ends, a zig-zag shaped path of current is established from the upper shunt 22 and the electrode 20 into the metal sheet 1; via the auxiliary contact 11a into the metal sheet 2; via the auxiliary contact 11b into the metal sheet 3 and through the lower shunt 25 to the electrode 21. Thus the metal sheets are warmed up; the layers 1b, 3a and 3b between the electrodes melt; contact is established by the pressure of the electrodes; and the welding is performed.

Figure 7:
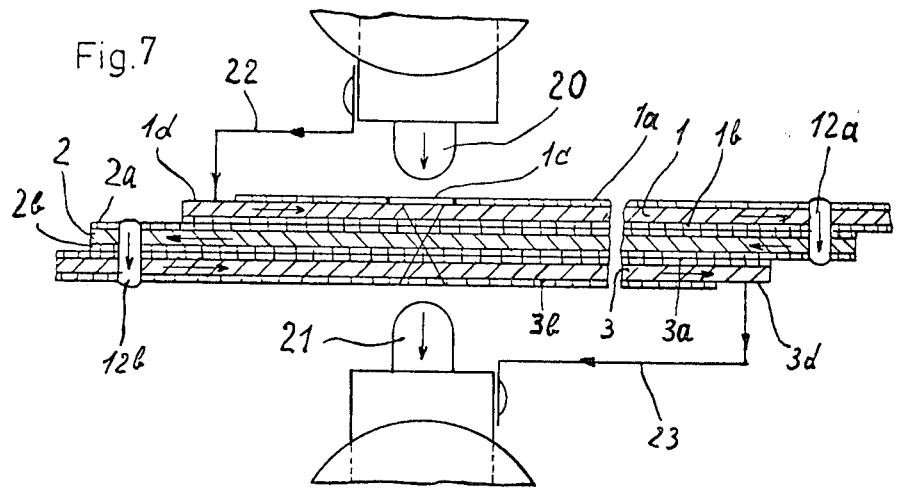

In accordance with FIG. 7 three sheet metal panels, each coated with layers on both sides, are to be connected to each other, namely an upper metal sheet 1, whose outer layer 1a has a stripped zone 1c for welding and a stripped zone 1d on the margin for an upper shunt 22; a middle metal sheet 2 having coating layers 2a, 2b; and a lower metal sheet 3, whose outer coating layer 3b has a stripped zone 3d on the margin for a lower shunt 23. In order to attain warming of all the layers, the current is conducted on a zig-zag path through the packet of metal sheets. For this purpose, the metal sheets 1 and 2 are connected by an auxiliary contact, e.g., a pin 12a, on the right hand side, and the metal sheets 2 and 3 are connected by an auxiliary contact on the left hand side. After applying the electrodes and switching on the current, the latter flows from the upper shunt 22 and electrode 20 into the metal sheet 1; via the right hand side auxiliary contact 12a into the metal sheet 2; via the left hand side auxiliary contact 12b into the metal sheet 3; and via the lower shunt 23 to the lower electrode 21. Thus the metal sheets are warmed up; the layers 1b, 2a as well as 2b, 3a and the layer 3b melt; contact is established between the metal sheets; and the welding is performed. Thereafter further weldings may be performed on any points desired without any stripping.

In accordance with FIG. 8, the warming current is conducted through the metal sheets in parallel. Three sheet metal panels 1, 2, 3, all coated on both sides and lying on top of one another are connected on both ends by pins 12c, 12d common to all of them and forming two auxiliary contacts. An upper shunt 22 connects the upper electrode 20 to a clamp contacting the pin 12d on the left hand side, from where it flows in parallel through all three metal sheets to the pin 12c on the right hand side, which is contacted by a clamp connected by a lower shunt 23 to the lower electrode 21. Only the uppermost layer of the sheet metal panel 1 is stripped at 1c underneath the upper electrode 20. After applying the electrodes and switching on the current, the latter flows from the upper electrode 20 through the upper shunt 22, left hand side auxiliary contact 12d in parallel through the three metal sheets 1, 3, 3 to the right hand side auxiliary contact 12c and hence through the lower shunt 23 to the lower electrode 21, and warms up the zones to be welded. Thus the coating layers melt; contact is established between the metal sheets 1, 2, 3; and welding is performed.

In a further embodiment according to FIG. 9, four sheet metal panels 1, 2, 3, 4, all coated with layers on both sides, are interwelded. The lowermost sheet metal panel 4 has a stripped zone 4c on its outer coating layer 4b for a lower electrode 21, and on the left hand side a stripped zone 4d for a shunt 22 leading to the upper electrode 20. On the right hand side all the metal sheets are connected to each other by an auxiliary contact, for example a rivet 12e. In the shunt 22 there is connected a regulating resistor 25. Thus the current intensity, in the shunt 22 as well as in the main electrodes 20, 21, can be so regulated, that on the uppermost metal sheet 1 only a very small weld spot is formed. There are then hardly any destructions around the weld spot. The lower the current intensity and the higher the electrode pressure, the smaller will be this upper weld spot on the non-stripped surface. Obviously also the uppermost metal sheet 1 may be connected to a shunt 23 (shown in dotted lines) leading to the lower electrode 21. Welding can then be performed without an auxiliary contact 12e. By such an auxiliary contact interwelding is, however, facilitated, and the quality of the weld spot is improved.

The method according to the invention is suitable also for the interwelding of so-called sound-damping sheet metal panels consisting of two steel sheets connected by a porous layer of synthetic material or by inserts of paper or fabric. For the use of such sound-damping sheet metal as walls, one surface is provided with a layer of synthetic material in order to attain the desired appearance. An embodiment of the connection of two sound-damping sheet metal panels is illustrated in FIG. 10. The upper sound-damping sheet metal panel comprises: an outer layer 1a, which has a stripped zone 1c for the upper electrode 20 and on the left and right outer stripped zones 1d each for a shunt 22 to the upper electrode 20; a steel sheet 1; a sound-damping layer 1b; and a steel sheet 2 with two connections, each for a lower shunt 23 to the lower electrode 21. The lower sound-damping sheet metal panel is arranged in mirror-symmetry: the steel sheet 3 is provided on both ends with connections to the upper shunts 22. Then there follows a sound-damping layer 4a; a steel sheet 4; and an outer coating layer 4b, which has a stripped zone 4c for the lower electrode 21 and stripped outer zones on the left and right 4d for the lower shunts 23. The steel sheets accordingly are connected alternately to the lower and upper electrodes. Between the two sound-damping sheet metal panels welding pieces 14 are cemented on the spots to be interwelded or are held there by magnetic force. Filler welding pieces 9 are put on outside in order to fill up the recesses formed when stripping off the sound-damping layers 1a, 4a. After applying the electrodes and switching on the current, the latter flows from the upper shunts 22 into the steel sheet 3; via the contact welding piece 14 into the steel sheet 2 and hence into the lower shunts 23, whereby the welding piece 14 is interwelded with the inner steel sheets 2, 3. By the heat generated the adjacent sound-damping layers 1b, 4a are fused; contact with the outer steel sheets 1 and 4, respectively, is established; and the interwelding thereof and, with the filler pieces 9, is performed.

Figure 11:
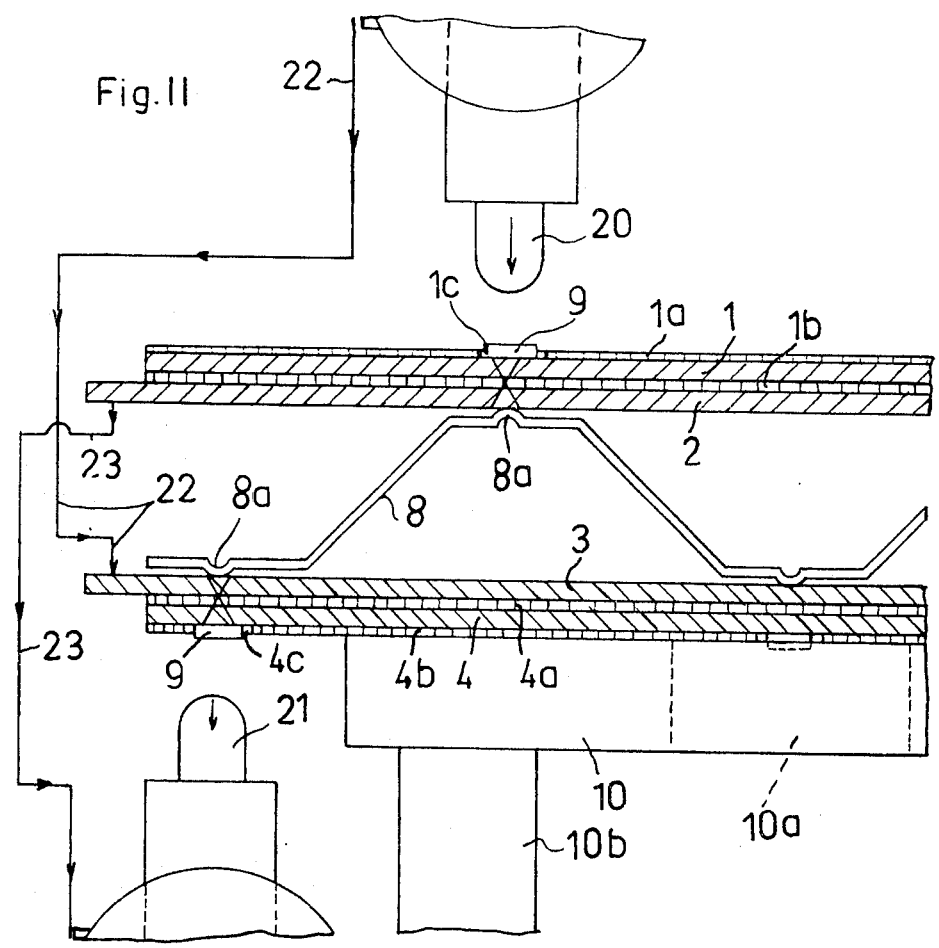

Such sound-damping sheet metal panels are used for partition walls e.g., in business premises, and together with a spacer they form a hollow wall in accordance with FIG. 11: under the upper electrode 20 lies a filler welding piece 9 in a stripped recess 1c of the layer 1a of the upper steel sheet 1. Then follows a sound-damping layer 1b and a steel sheet 2. The upper sound-damping sheet metal panel rests on an undulating spacer 8, which is provided with bulges 8a on the weld points. The lower weld points are offset from the upper ones and rest on the lower sheet metal panel 3. Then follows the sound-damping layer 4a, the steel sheet 4 and a filler welding piece 9 in a stripped recess 4c of the outer coating layer opposite the electrode 21. In view of the fact that the electrodes are offset relative to each other, the partition wall is placed on a plate 10 having cutouts 10a and supports 10b. An upper shunt 22 is connected to the metal sheet 3, and a lower shunt 23 is connected to the metal sheet 2. After switching on the current, the same flows from the upper shunt 22 into the metal sheet 3, and via the bulge 8a of the spacer 8 into the metal sheet 2 and hence into the lower shunt 23. The warming of the bulges 8a melts the sound-damping layers 1b, 4b so that welding can be performed.

Figure 12:
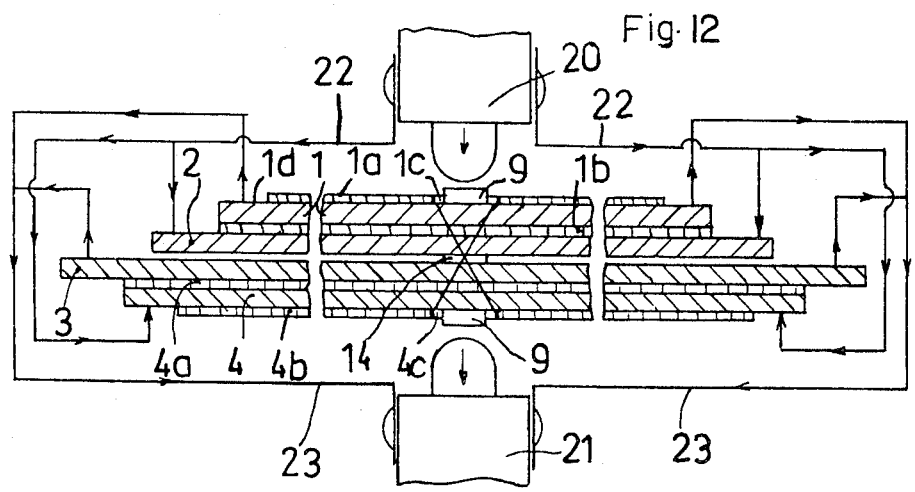

The shunts could be connected to the sheet metal panels in a different manner. In the embodiment according to FIG. 12, with the same sound-damping sheet metal panels as in FIG. 10, the upper shunt 22 is connected to the sheets 2 and 4, and the lower shunt 23 is connected to the sheets 3 and 1. When applying the electrodes, current flows from the upper electrode 20 via the upper filler welding piece 9 and the sheet 1 to the lower shunt 23, and likewise current flows from the upper shunt 22 through the sheet 4 and the lower filler welding piece 9 to the lower electrode 21. At the same time current flows from the upper shunt 22 into the sheet 2 and via the welding piece 14 into the sheet 3 and to the lower shunt 23. Thus interwelding of the welding piece 14 is initiated. The warming up of the areas to be welded melts the intermediate layers; contact between the sheets 1, 2 and 3, 4 is established; and welding is performed.

Provided all the sheets are connected to shunts, the sound-damping sheet metal panels may be provided with coating layers on both sides, without requiring stripping of the inner coating layers lying upon each other.

The welding operations according to FIGS. 1 - 12 may even be carried out without external stripping below and above the electrodes. For this purpose alternating currents of comparatively high frequency are to be used in the shunts. Advantageously a current of high frequency and high voltage is used also for the welding electrodes. The relative current conditions can be adjusted by regulating resistors.

Figure 13:
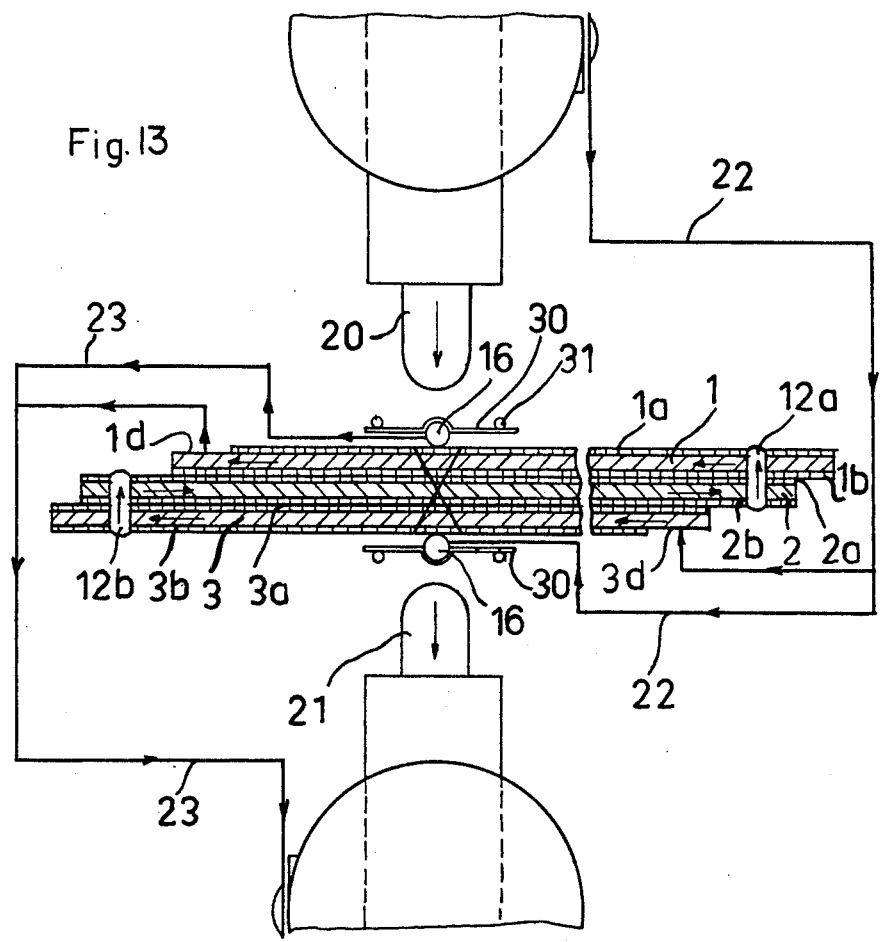

A further possibility of dispensing with the stripping of outer layers is shown in FIG. 13. For this purpose metal wires stretched out between the electrodes and the area to be welded are connected to the opposite electrodes by shunts. In the embodiment illustrated, three sheet metal panels, all coated with layers on both sides, are to be connected to each other, namely the upper sheet 1 having the layers 1a, 1b and the connection 1d to the lower shunt 23; the middle sheet 2 having the layers 2a, 2b; and the lower sheet 3 having the layers 3a, 3b and the connection 3d to an upper shunt 22. The sheets 1 and 2 are connected to one another on the right hand side by an auxiliary contact, e.g., a pin 12a, and the sheets 2 and 3 are connected to one another on the left hand side by an auxiliary contact 12b; thus a zig-zag path of the current results for warming up the metal sheets. Underneath the upper electrode 20 a press-in wire 16, and above the lower electrode 21 a further press-in wire 16 is stretched out, and each such wire is connected by the shunt 23 and 22, respectively, to the opposite electrode 21 and 22, respectively. When pressing-on the electrodes the wires are forced into the comparatively soft layers of, say, polyvinylchloride, so that they contact the metal sheet in an electrically conductive manner. These wires may consist of a low melting point metal. When switching on the current, the wires under the electrodes then melt, destroy the insulating layer and establish electrical contact to the metal sheet. By the warming-up and by the heat of the welding also the internal layers melt; contact between all the metal sheet is established; and welding is performed.

Figure 14:
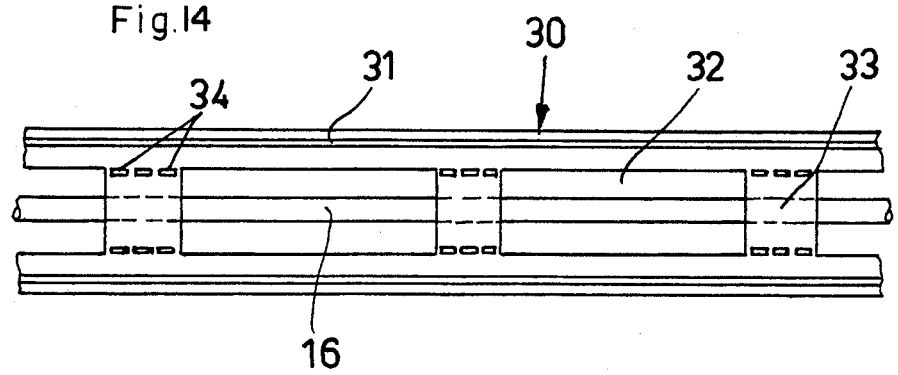

For holding and continuously supplying the press-in wires 16 a holder belt 30, e.g., of paper, is provided, which is reinforced on its margins by cords 31, e.g., of synthetic material, see FIG. 14. In the middle region the belt has oblong punched-out slots 32 leaving narrow bridge portions 33 between them, which can be readily severed from the reinforced margins by the aid of perforations 34. These bridge portions are coated with cement and thus hold the press-in wire 16. When pressing the same on, the said bridge portions are torn off; after the welding the margin portions of the holder belt are wound on a reel, and new belt portions provided with wire are pulled over the work piece or a subsequent work piece. The wires are connected to the shunts by means of sliding contacts.

Figure 15:
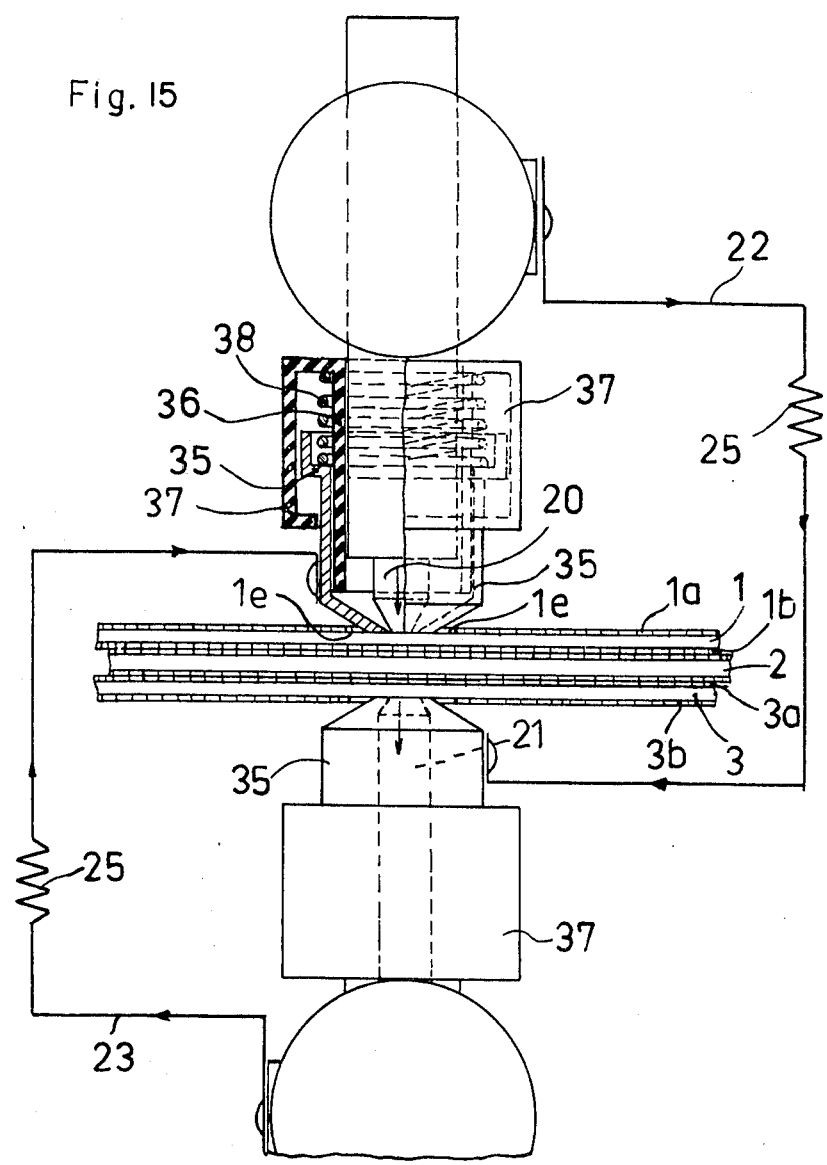
Figure 16:
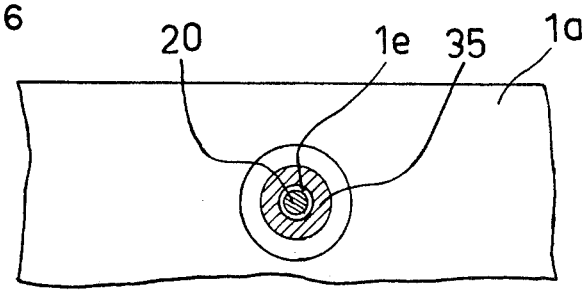

A further example of warming the sheet metal panels by the aid of shunts is illustrated in FIGS. 15 and 16. A packet consisting of three sheet metal panels 1, 2, 3, each coated with layers on both sides, is provided on the outermost layers 1a and 3a, respectively, with comparatively large stripped zones 1e, which take in also a contact tube 35 in addition to a welding electrode 20, 21. One contact tube is mounted slidably on the electrode 20 by means of an insulating sleeve 36; said tube is covered on top by an insulating casing 37 and is biased downwardly by a spring 38; it is connected to the opposite electrode 21 by a lower shunt 23 and a regulating resistor 25. Likewise the lower electrode 21 is surrounded by a contact tube 35, which is connected to the upper electrode 20 by an upper shunt 22 and a regulating resistor 25. When pressing-on the electrodes and contact tubes, the metal sheet is contacted firstly by the annular end face of the contact tube and then also by the working end face of the electrode, the ring shaped area between these two end faces being kept clear (FIG. 16) and the corresponding area of the metal sheet forming an electrical resistance. After switching on the current, the same flows from the upper electrode 20 into the sheet metal 1; via the contact tube 35 and the lower shunt 23 to the lower electrode 21; and likewise from the lower electrode 21 into the metal sheet 3; via the contact tube 35 and shunt 22 to the upper electrode 20. The current heats the metal sheets; the underlying coating layers melt; contact is established; and welding is performed. The warming of the upper sheet metal panel suffices in many cases, so that stripping of the lowest coating layer can be dispensed with.

Figure 17:
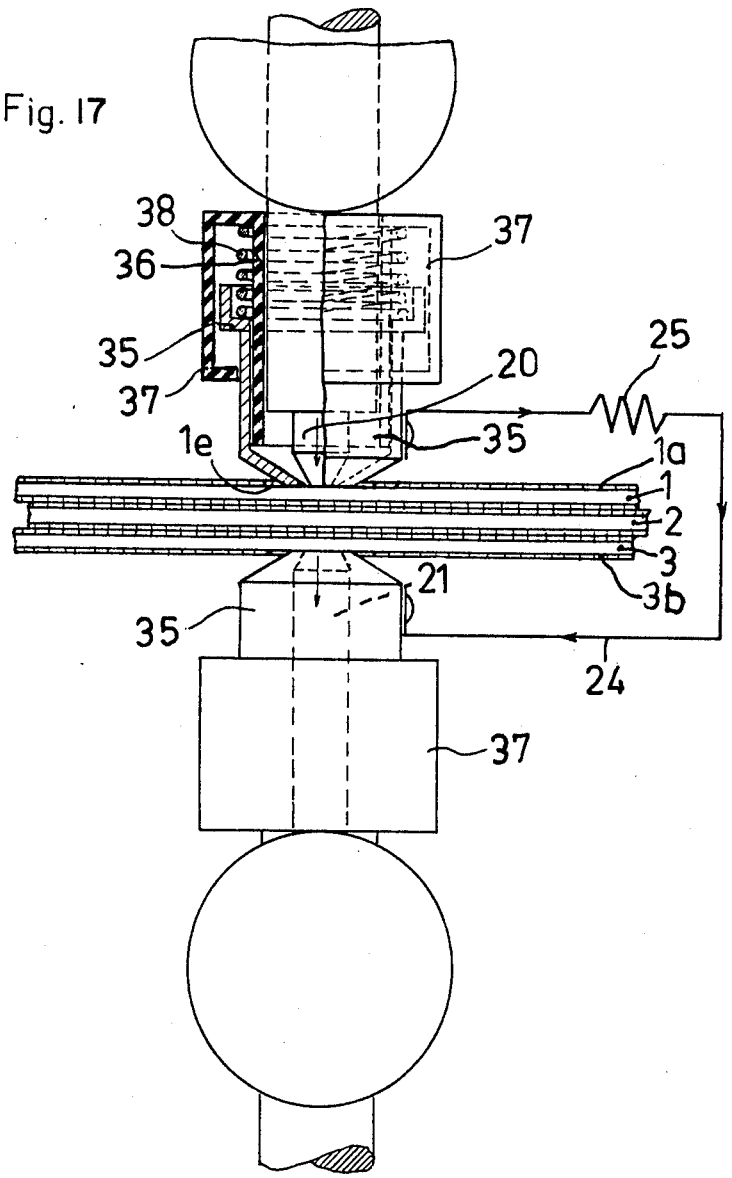

In the embodiment according to FIG. 17 one shunt only is required. Three sheet metal panels 1, 2, 3, each coated with layers on both sides, are provided on their outermost layers 1a and 3a with comparatively large stripped areas. The upper electrode 20 and lower electrode 21 are identically provided each with a contact tube 35. These contact tubes are not, however, each connected to a shunt, but are directly connected to each other by a connecting line 24 and a regulating resistor 25. When applying the contact tubes and electrodes to the packet of sheet metal panels, current flows from the upper electrode 20 through the metal sheet 1 to the upper contact tube 35; via the connecting line 24 to the lower contact tube 35 and through the metal sheet 3 to the lower electrode 21. The current heats the metal sheets 1 and 3; the coating layers melt; and welding is performed.

The number of fully coated sheet metal panels capable of being interwelded in this manner depends on the intensity, period of application, voltage, and frequency of the current and on the pressure of the electrodes. Additionally, for improving the result of the welding, vibrator devices, e.g., in conjunction with electrode carrier arms, as well as heating devices may be provided, by means of which the sheet metal panels are heated to a temperature below the temperature withstood by the coating materials.

Figure 18:
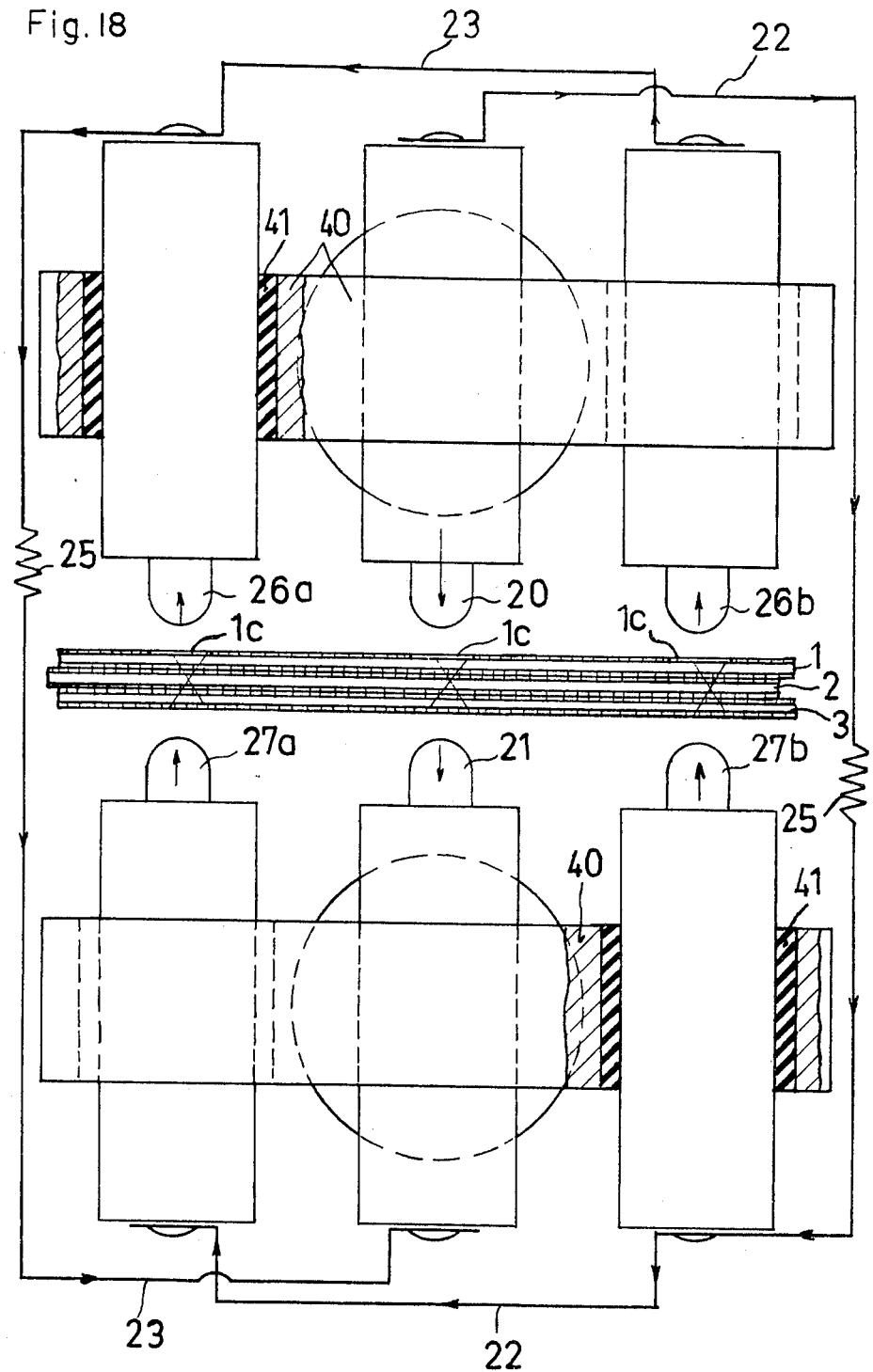

A further series of possible arrangements for the heating of sheet metal results from the use of electrodes arranged side-by-side or of double-point electrodes, wherein the current flows firstly along the metal sheets for warming the same, and then the shorter way across the sheets for welding. A first embodiment is illustrated in FIG. 18. A packet consisting of three sheet metal panels 1, 2, 3, each coated with layers on both sides is provided on an outer coating layer with three stripped areas 1c. On an upper electrode carrier arm a main electrode 20 and a holder 40 are mounted, which carries on insulations 41 an auxiliary electrode 26a on the left, and an auxiliary electrode 26b on the right of the electrode 20. Likewise, on a lower electrode carrier arm a main electrode 21 and a holder 40 are mounted, which carries on insulations 41 two auxiliary electrodes 27a and 27b. From the upper electrode 20 an upper shunt 22 leads through a regulating resistor 25 to the lower auxiliary electrodes 27b and 27a. A lower shunt 23 leads from the upper auxiliary electrodes 26b and 26a through a regulating resistor 25 to the lower main electrode 21. When switching-on the current, the same flows firstly from the upper main electrode 20 through the metal sheet 1 to the upper auxiliary electrodes 26a, 26b; the sheets are heated; the coating layers melt; contact is established likewise on the lower electrodes; and welding is performed simultaneously on three places. Stripping of the underside is unnecessary.

Figure 19:
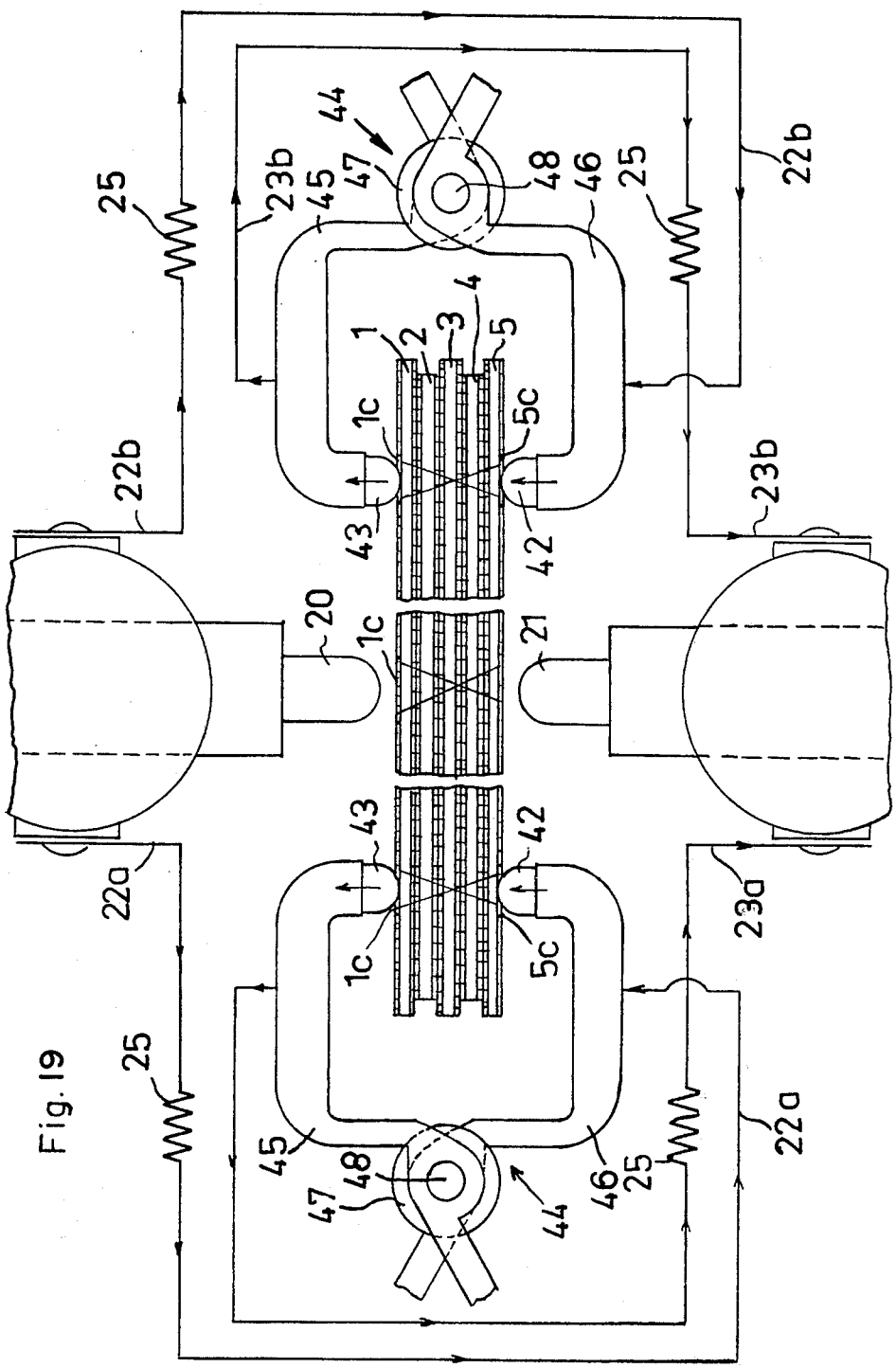

In accordance with FIG. 19 the auxiliary electrodes are constructed as welding tongs. A packet consisting of e.g., five sheet metal panels 1 – 5, each coated on both sides with layers. The top coating layer is provided with stripped zones 1c for the main electrode 20 and for two auxiliary electrodes 43, and the lowest coating layer is provided only with stripped zones 5c for the tong electrodes 42, but not for the main electrode 21. From the upper main electrode 20 two upper shunts 22a, 22b, each containing a regulating resistor 25, lead to the lower electrodes 42 of the welding tongs 44. Likewise two shunts 23a, 23b, each containing a regulator resistor 25, lead from the lower main electrode 21 to the upper tong electrodes 43. The upper arms 45 of the welding tongs are electrically insulated by insulating discs 47 and insulating axles 48 from the lower arms 46. After applying the electrodes and switching-on the current, the latter flows firstly from the upper main electrode 20 through the uppermost sheet 1 to the auxiliary electrodes 43, hence through the lower shunts 23a, 23b to the lower main electrode 21, and also from the upper shunts 22a, 22b and lower auxiliary electrodes 42 to the lower main electrode 21. By the warming-up of the metal sheets the coating layers melt in succession, and welding is performed simultaneously on three points. The regulating resistors 25 are so adjusted, that as much current flows through the auxiliary electrodes as through the main electrodes. It is decisive, that at least one main electrode is to be supplied with current from the opposite electrode.

Figure 20:
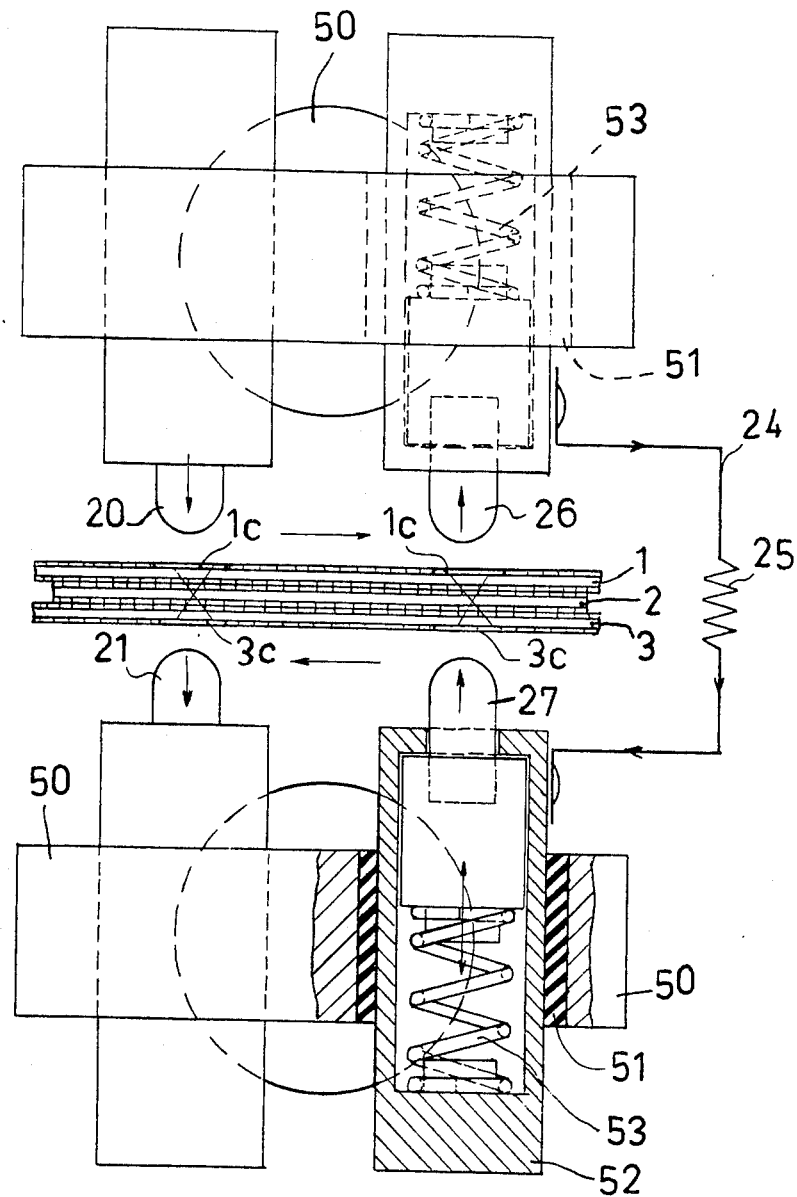

A further embodiment having a pair of auxiliary electrodes is shown in FIG. 20. A packet consisting of e.g., three sheet metal panels 1, 2, 3, each coated with layers on both sides, is provided on its outermost coating layers with stripped zones 1c, 3c on the spots to be welded. An upper electrode carrier arm carries a holder 50 with a main electrode 20 and an auxiliary electrode 26, which is attached to the holder by an insulation 51. A lower electrode carrier arm carries a holder 50 for the lower main electrode 21 and for a lower auxiliary electrode 27. The upper auxiliary electrode 26 is electrically connected to the lower auxiliary electrode 27 by a conductor 24 containing a regulating resistor 25. The auxiliary electrodes are slidably mounted in a casing 52 and are subjected to the bias of a spring 53 compensating uneveness in the sheet metals. After applying the electrodes and switching on the current, the same flows from the upper main electrode 20 through the upper sheet 1 to the auxiliary electrode 26; through the connecting line 24 to the lower auxiliary electrode 27; and through the lower sheet 3 to the lower main electrode 21. The metal sheets, through which the current flows, are warmed up, and melt the coating layers, whereby welding is performed on both spots.

Figure 21:
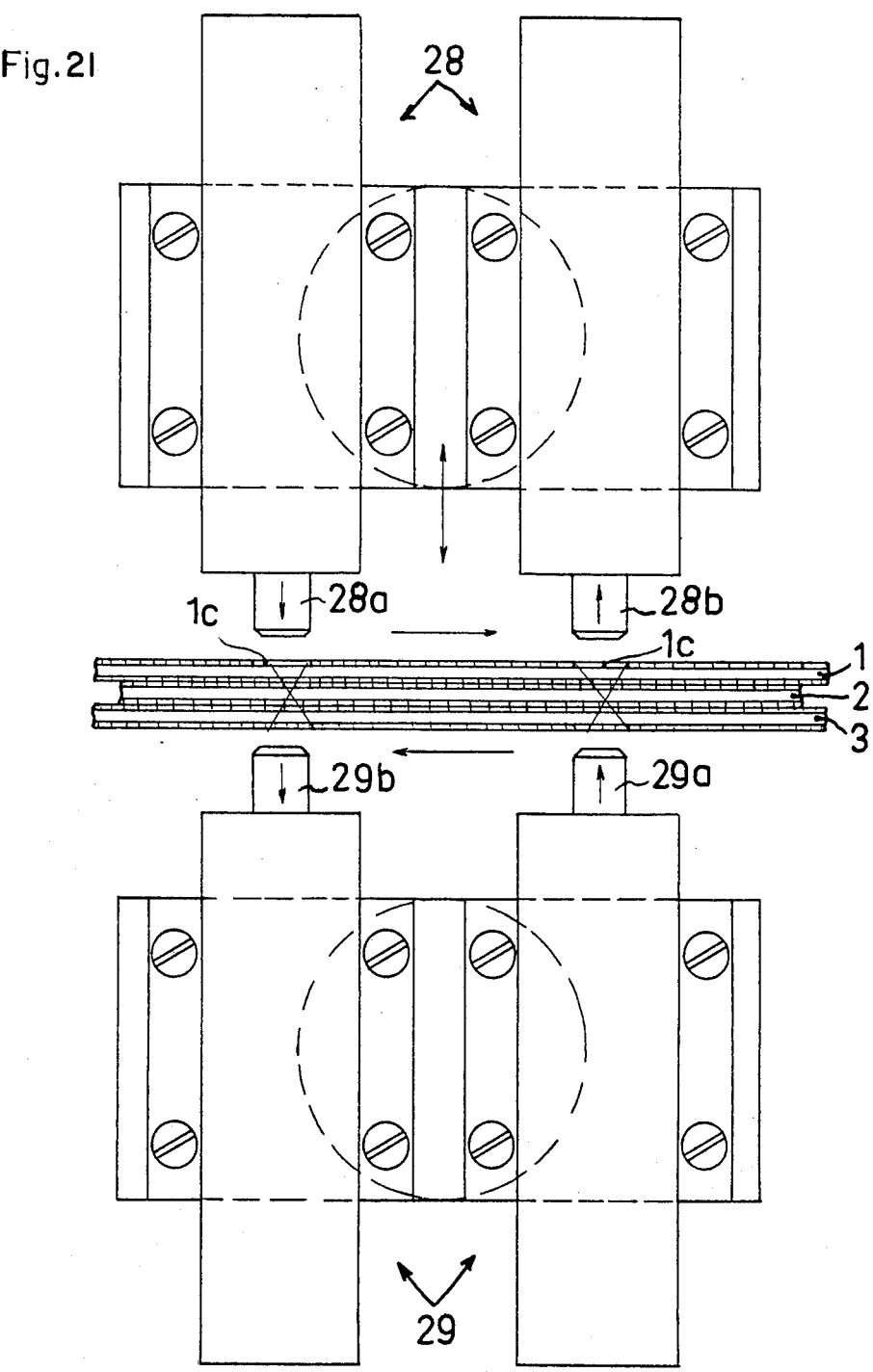

A third embodiment is shown in FIG. 21 having so-called double-point electrodes, wherein an electrode and counter-electrode are arranged in parallel side-by-side relation on one side of the sheet metals. A packet consisting e.g., of three sheet metal panels 1, 2, 3, each coated with layers on both sides, is provided with stripped zones 1c for the electrodes 28a, 28b of a double-point electrode 28. Underneath the packet of sheet metal panels a second double-point electrode 29 having the electrode 29a, 29b is arranged, the opposite electrodes such as 28a and 29b being of opposite polarity. After applying the electrodes and switching-on the current, the same flows in the upper double-point electrode 28 from the first electrode 28a through the metal sheet 1 to the second electrode 28b. Thereby the metal sheet is warmed-up; the adjacent coating layers melt; and interwelding takes place between the electrode pairs 28a, 29b and 28b, 29a, respectively. Stripping of the coating layer on the underside of the sheet metal packet is not necessary. An electrical field is generated having inductive effects, and "bunching" takes place between the opposite electrodes in such a manner, that the coating layer on the underside is quickly melted.

Contact between the electrical components such as electrodes, shunt lines and sheet metal layers across the insulating coating layers may alternatively be established by the provision of cutting edges, points or teeth etc. on the sheet metal panel to be interwelded itself, on metallic press-in pieces or on the electrodes.

Figure 22:
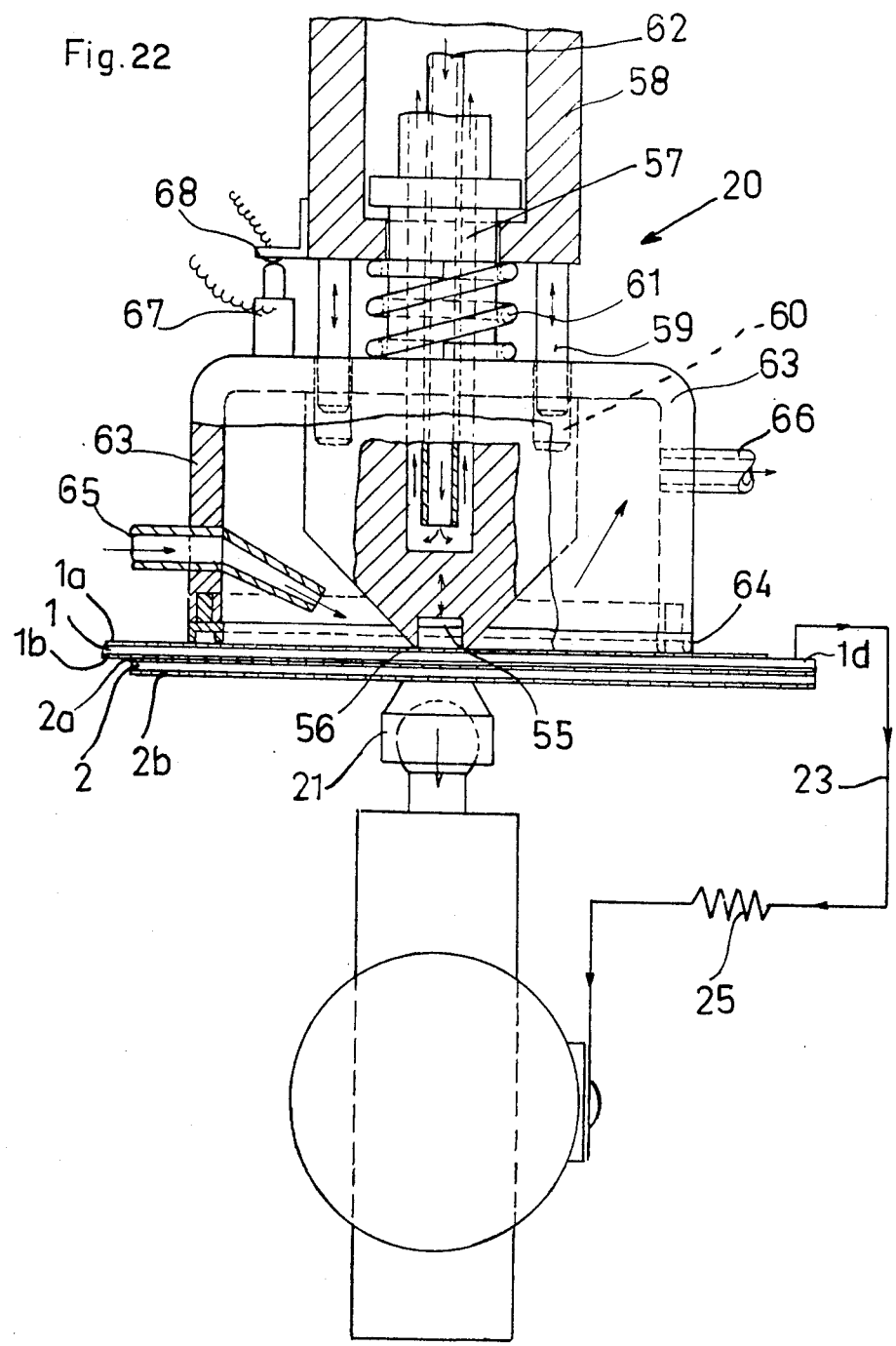

According to a first embodiment the electrode itself is provided with a cutting edge, which penetrates the coating layer down to the metallic sheet. In FIG. 22 two sheet metal panels 1, 2 coated on both sides with layers 1a, 1b and 2a, 2b, respectively, are shown. The uppermost coating layer 1a is provided with a stripped zone 1d on its margin for connection to a lower shunt 23 containing a regulating resistor 25 and leading to the lower electrode 21. The lower electrode 21 is constructed as a swivelling electrode, which is mounted e.g., by means of a part-spherical cup on a part-spherical head. The upper electrode 20 has on its tip a cylindrical milled recess 55 forming an annular edge 56, and consists e.g., of a resistant copper-tungsten alloy. On top of this electrode is mounted by means of a shank 57 in a holder 58, electrically connected by pins 59 engaging in bores 60, and biased by a spring 61 towards the work piece. In the hollow shank 57 a pipe 62 is inserted, through which water is introduced for cooling the electrode. When pressing-on the electrode, the cutting edge 56 penetrates the coating layer 1a and establishes contact with the metallic sheet 1. Current flows from the upper electrode 20 through the annular edge 56 into the metallic sheet and hence to the shunt 23. Thereby the metallic sheet 1 is warmed-up, the coating layers melt, and welding is performed. Moreover, the electrode 20 is surrounded by a protective hood 63, which rests on the sheet metal packet with a sealing ring 64. On the left hand side, a pipe 65 supplies a protective gas, which prevents oxidation of the weld, and which is sucked off on the right hand side through a pipe 66. When pressing-on the electrode, an end switch 67 is actuated by an angle bracket 68, whereby the sucking-off device is switched-on.

Figure 23:
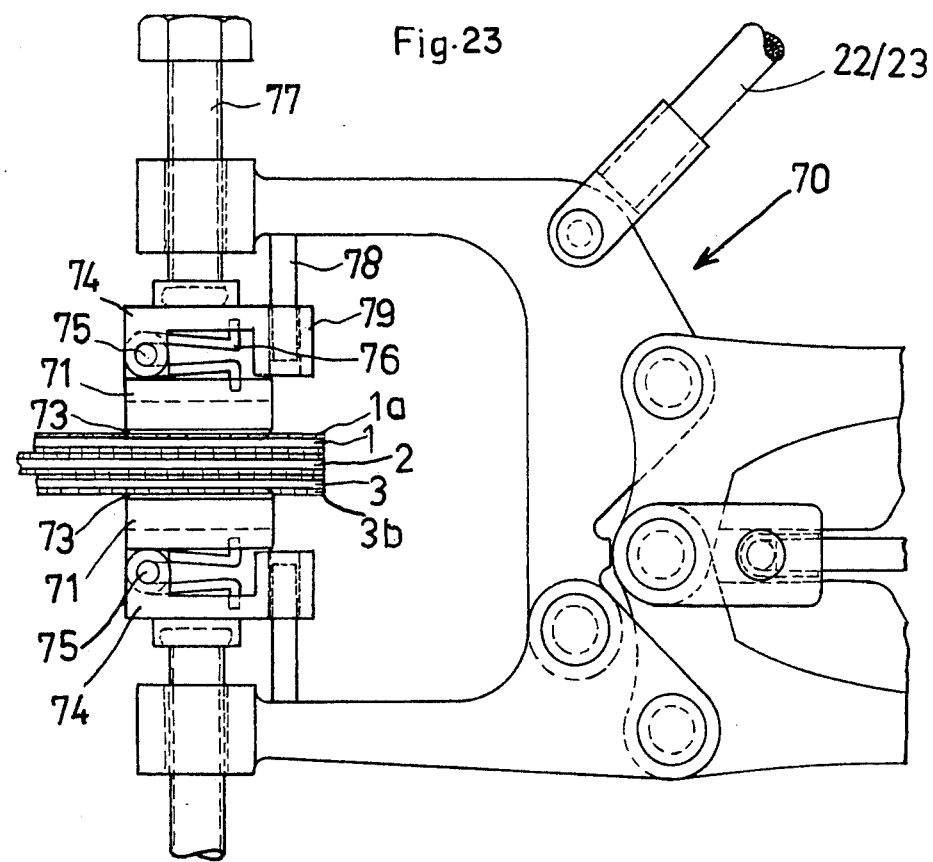
Figure 24:
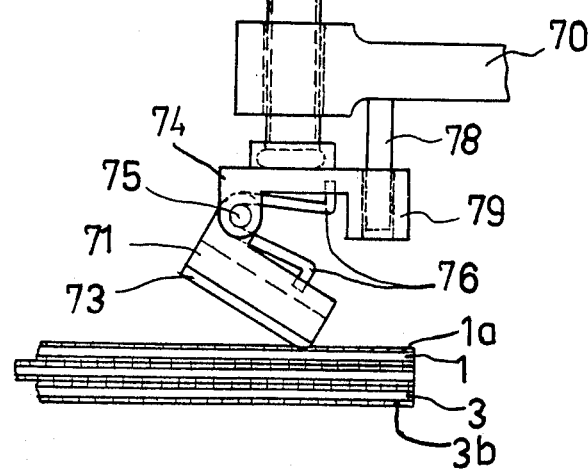
Figure 25:
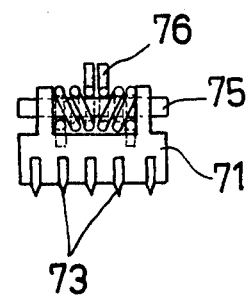

In a second embodiment the layers are pierced by straight blades e.g. for connection to a shunt 22, 23. In accordance with FIGS. 23 – 25 the upper and lower jaws 71 of a clamping tong 70 are provided with blades 73, which pierce the layers 1a, 3b of the sheet metals 1 and 3, respectively. In order to produce a cutting movement when applying the cutter jaws to the sheet metal panels, these blades are pivotally mounted on one side on jaw heads 74 by means of bolts 75, and are capable of being spread out by the bias of springs 76, see FIG. 24, in such a manner that the blades penetrate the coating layers firstly with one corner, and then cut the layers longitudinally until the blades rest completely on the sheet metal. For adaptation to the thickness of the sheet metal packet, the distance between the jaws is adjustable by means of screws 77, while guide pins 78 of the tong engage in slots 79 of the jaw heads 74.

Figure 26:
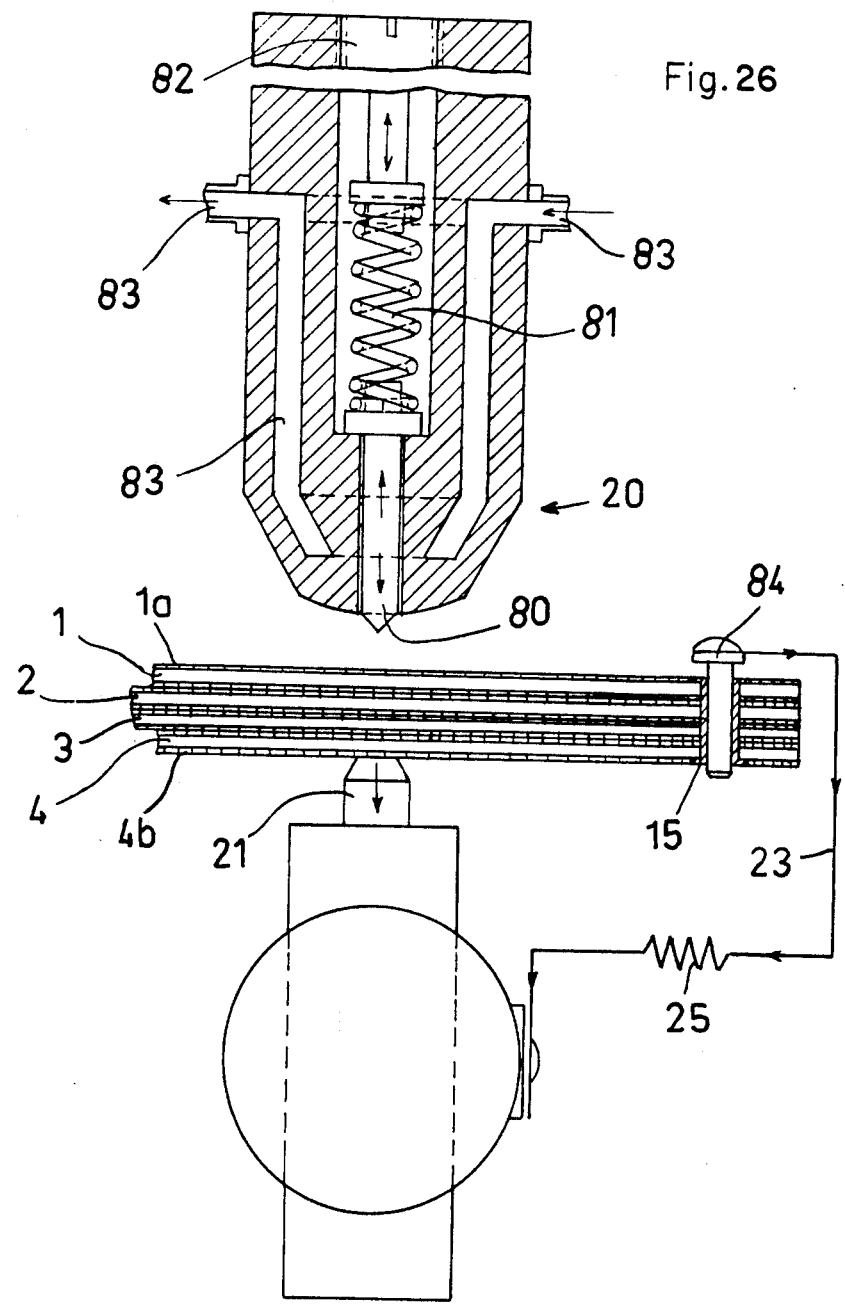

In a third embodiment the coating layer is pierced by a pointed bolt, which is mounted resiliently within the electrode. In accordance with FIG. 26 the upper convex welding electrode 20 has a bore in its longitudinal axis, wherein a pointed thrust bolt 80 consisting e.g., of a copper-tungsten alloy is guided slidably. The bolt is provided on top with a collar and is loaded by a strong compression spring 81, which can be adjusted by means of a screw 82. Moreover, the upper electrode is provided with pipes and ducts 83, through which water is supplied and discharged as a coolant. In FIG. 26 a packet consisting of four sheet metal panels 1, 2, 3, 4, each coated with layers on both sides, is shown, whose metal sheets are electrically connected with each other by an auxiliary contact. The latter consists of a hollow rivet 15, to which a shunt 23 is connected by means of a push-in pin 84. The shunt leads via a regulating resistor 25 to the lower electrode 21. When pressing-on the electrodes, firstly the point of the thrust bolt 80 penetrates the layer 1a; current flows through the metal sheet 1 to the lower electrode; the layer 4b melts; the lower electrode 21 contacts the metal sheet 4; and welding is performed. The hollow rivet 15 and pin 84 fix the position of the sheets and assist the welding.

In a fourth embodiment, the layers are cut by means of cutter discs for roller seam-welding. In FIGS. 27, 28 a packet consisting of three sheet metal panels 1, 2, 3, each coated with layers on both sides, is illustrated, the sheets being connected electrically on the right hand side e.g., by a pin 12. Each of the welding rollers 86 comprises two roller discs 87 and interposed between them a contact cutter disc 88. The cutter disc is mounted by means of an elastic flanged sleeve 89 on a common shaft 90. The sleeve 89 may give way into a groove 91 of the shaft and into recesses 92 inside the welding roller discs 87. For readily exchanging the cutter discs, the welding roller discs are attached to the shaft 90 by means of pins 93. When the upper and lower welding rollers are pressed on the sheet metal packet, the contact cutter discs 88 penetrate the coating layers 1a and 3b, respectively. Current flows from the upper welding roller 86 through the cutter disc 88 into the upper metal sheet 1; through the pin 12 into the lower metal sheet 3; and hence through the lower cutter disc 88 into the lower welding roller 86. The current warms the sheet metal; the coating layers melt and give way under the pressure of the belled welding rollers in such a manner, that welding can take place.

Figure 29:
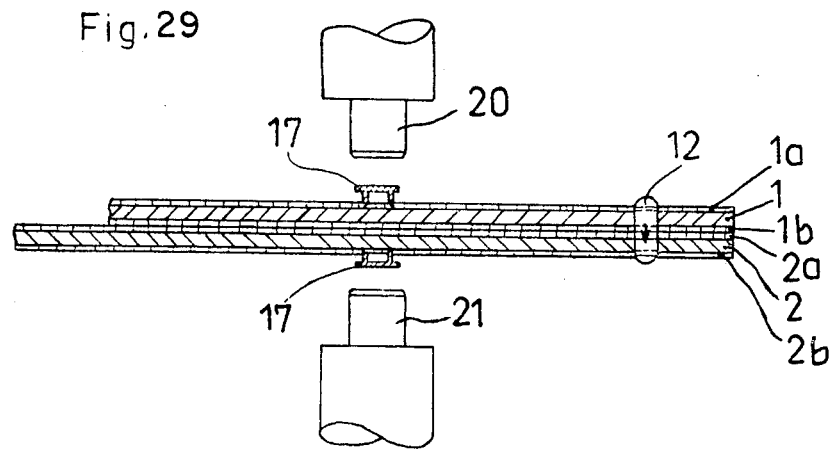
Figure 31:
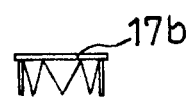
FIGS. 31, 32 show a press-in body produced from a disc, in elevation and plan view, respectively.
Figure 33:
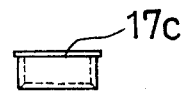
FIGS. 33, 34 show a press-in body in the form of a hollow rivet in elevation and plan view, respectively.
Figure 32:
Figure 34:

In a fifth embodiment, contact is established by means of press-in bodies penetrating the insulating layers with their teeth. In FIG. 29 two sheet metal panels 1,2, each coated with layers on both sides, are electrically connected with each other by an auxiliary contact, e.g., a pin 12. Underneath the upper electrode 20 and above the lower electrode 21, press-in bodies 17 are placed on the coating layers 1a and 2b, respectively. In accordance with FIG. 30, the press-in body is made as a piece of sheet metal 17a with points angularly turned down, or in accordance with FIGS. 31, 32 as a disc 17b having downwardly directed teeth, or in accordance with FIGS. 33, 34 as a hollow rivet 17c having an annular cutting edge on its lower end.

When pressing-on the electrodes, the teeth or edges of the press-in bodies penetrate the coating layers and establish electrical contact with the metal sheets. Current flows from the upper electrode 20 through the upper press-in body 17 into the metal sheet 1; through the pin 12 into the metal sheet 2, hence through the lower press-in body 17 to the lower electrode. The metal sheets are warmed-up, the coating layers melt; welding is thus effected. The press-in bodies fill in the weld spot. They may be made of low melting point metal if desired.

Figure 30:
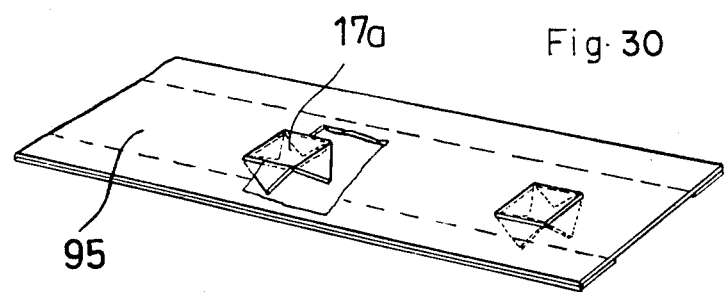
FIG. 30 shows in perspective illustration a holder belt for press-in bodies.
Figure 35:
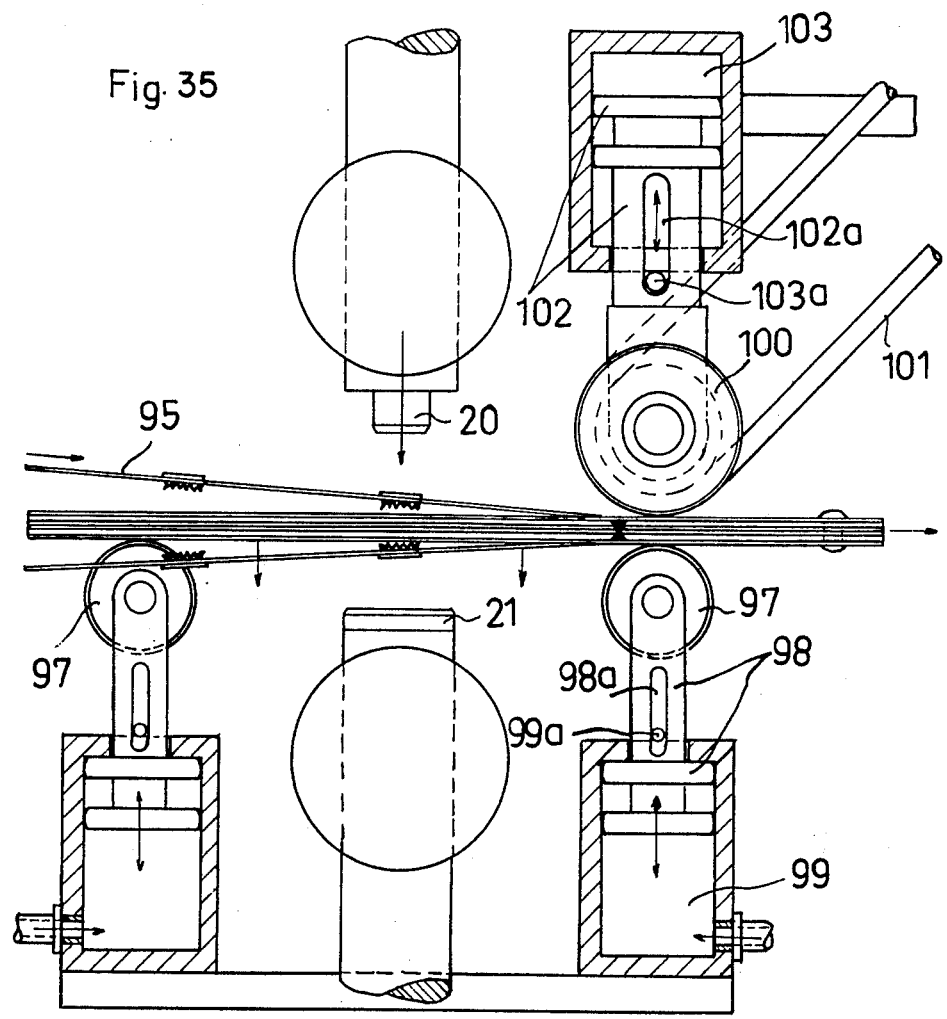
FIG. 35 shows an automatic supply of press-in bodies to a spot-welding machine by means of belts, in side elevation.

For the automatic supply of press-in bodies to the spots to be welded, belts 95 according to FIG. 30 may be provided, consisting of non-flammable impregnated paper, into which the press-in bodies are inserted with their teeth from above. The belts with the press-in bodies are placed on top of and below the sheet metal panels 1, 2, respectively, see FIG. 35. In order that they may not rub on the lower electrode 21 when transported, the sheet metal panels lie on rollers 97, which can be raised by the pistons 98 of pneumatic cylinders 99. Turning of the piston rods is prevented by elongated slots 98a and pins 99a engaged in the same. On the upper side of the sheet metal panels and opposite the right hand side roller 97 there is mounted a pressure roller 100 for the transport of the sheet metal panels which roller is driven from a motor by a belt 101. In order that the pressure roller can partake in the up-and-down movements of the sheet metal, this roller is mounted on a piston 102, which is loaded in a cylinder 103 by compressed air and is secured against rotating by an elongated slot 102a engaged by a pin 103a. For welding, the pistons 98 are lowered, and after the welding the same are raised and the motor is switched on, until the next press-in bodies come to lie under and above the electrodes, respectively. Instead of belts carrying separate press-in bodies, sheet metal strips with teeth may be used, particularly for roller seam-welding.

A different way of supplying press-in bodies is illustrated in FIG. 36. By the side of an electrode 20 a container 105 of press-in bodies 17 is mounted pivotally about an axle 106. Brushes 107 rotating on the container bring the press-in bodies in the right positions into a supply chute 108, which ends underneath the electrode, and bears with an arm 109 and roller 110 on a recess 112 of the electrode holder 111. In the electrode 20 a centering pin 113 is inserted against the bias of a spring 114. When pressing-on the electrode, firstly the centering pin takes up the foremost press-in body 17, then the electrode holder forces the supply chute and container to swing aside by the roller 110 running up the ramp-shaped outlet of the recess 112; the press-in body 17 is placed on the coating layer 1a and pressed through the same down to the metal sheet 1 by the electrode 20 following up. Then current flows from the upper electrode 20 through the press-in body 17 into the metal sheet 1, and hence through the shunt 23 with regulating resistor 25 to the lower electrode 21, whereby welding may be performed. Pipes 115 and ducts supply coolant to the electrode holder.

In a sixth embodiment the press-in bodies are provided with teeth on top and bottom, and are inserted between the sheet metal panels to be interwelded. According to FIG. 37 a sheet metal panel 2 having coating layers 2a, 2b resets on the lower electrode 21; on top of this panel there is placed a serrated ring 18 having upper and lower teeth; then follows a sheet metal panel 1 having coating layers 1a, 1b, and finally the upper electrode 20. When pressing-on the electrodes, the teeth penetrate the coating layers, and establish contact between the metal sheets 1, 2, whereby welding can be performed. The press-in body fills at the same time the welded spot.

According to a seventh embodiment the press-in body is formed of the sheet metal itself by deformation thereof. In accordance with FIG. 38, a sheet metal panel 1 having coating layers 1a, 1b and an upper stripped zone 1c rests on a die 117 having a bore 118. A punch 119 forces its point through the sheet metal, and tears it up whereby a crown of serrations is formed. For the welding operation, the sheet metal panel is placed, a shown in FIG. 39, with the crown of serrations 1f upward, upon a swivel electrode 21, which with a recessed tip 21c contacts the stripped area 1c. On top of this lies a sheet metal panel 2 having coating layers 2a, 2b and a stripped area 2c. Whent the upper electrode 20 is pressed down, the crown of serrations 1f penetrates the layer 2b and establishes contact, whereby welding may be performed.

For the purposes of welding without the stripping of layers, heating of the outer layers may be effected by means of heating elements or of hot air. The heatin elements are arranged within or immediately by the side of electrode. In accordance with FIG. 40 the electrode 20 is surrounded by a tubular punch 120, which is heatable by means of a heating coil 121 supplied by a current source. The heating stamp is spaced from the electrode by means of insulating rings 122; guided by an insulating mass 123 in a protective cap 124; and biased downwardly by a spring 125. When the water-cooled electrode 20 (with an internal coolant duct 126) is pressed down, firstly the heating stamp 120 is placed on the upper layer 1a of the sheet metal panel 1; this layer melts and is displaced by the electrode 20 when the latter is pressed down, whereby the same comes in contact with the metal sheet 1; and welding is made possible. In addition, an identical electrode with heating stamp or an ordinary electrode with an auxiliary contact and shunt may be arranged on the underside of the sheet metal panel 2. Since, when melting the layer and by decomposition of the synthetic materials, gases such as chlorine or the like are developed, the electrode is surrounded by a hood 127 with connections 128 to an aspiration device. This hood may consist of transparent synthetic material in order to allow observation of the welding operation.

In the embodiment according to FIG. 41 a heating stamp 130 is provided with a heating coil 131 and is surrounded by an insulation 132 accomplished in an enlargement of the central bore 136 of the electrode 20. Laterally thereof the electrode has ducts 137 for water-cooling, and carries on top copper columns 138 with heads 139, which are movable up-and down, like the head 133 of the heating stamp, in an electrode holder 140. The electrode 20 is biased downwardly by springs 141, and the heating stamp is likewise biased downwardly by a spring 135. In the rest position the lower portion of the heating stamp is heated; when depressing the electrode holder, the heating stamp 130 abuts the layer 1a after the electrode 20 and melts the said layer, whereby the circular edge of the electrode comes into contact with the metal sheet 1. Current flows through the sheet 1; over the shunt 23, the regulating resistor 25, and to the lower electrode 21, whereby welding may be effected without stripping off a layer.

In a second embodiment the coating layer is fused by means of hot air. In FIG. 42 an internal hot air device 142 is accommodated in a central bore 136 of an electrode 20 instead of the heating stamp. This device comprises a central supply tube 143 and a coaxial discharge tube 144, both of which end slightly above the annylar edge 145 of the electrode. After applying the electrode with the heating device to the metal panel 1, the coating layer 1a melts, and the edge of the electrode penetrates to the metal sheet 1. Current flows from the upper electrode through the metal sheet 1, the auxiliary contact 12 and the metal sheet 4 to the lower electrode 21, which engages in a stripped zone 4d. Welding can thus be performed. In order to limit the effect of the hot air on the layer 1a, a cooling plate 146 is placed on the layer 1a, which plate has holes 147 at the spacing of the weld spots, see FIG. 43.

In a modification according to FIG. 44, an outer hot air device 150 is arranged around the electrode 20. This device comprises a tube 151 surrounding the electrode and guided slidable on the same, which tube has substantially the same diameter as a stripped zone would have on the spot to be welded, and which has a flange 152 for sealing on its lower end. This tube is pressed downwardly by a spring 155, so that it protrudes beyond the electrode. In the interior of this tube issues a hot air supply pipe 153 and from it branches of a hot air discharge pipe 154, both these pipes being guided on a casing 156 mounted on the electrode. For the purpose of saving the coating layer, a cooling plate 146 with holes 147 is placed on the top layer, and is held in position, together with the sheet metal panels, by electromagnets 158. After lowering the hot air tube 151 on the cooling plate, the hot air melts the layer 1a on the weld spot. Then the electrode is pressed across the softened layer down to the metal sheet. In order to facilitate the formation of a contact, the electrode may be provided with cutting serrations 157, see FIG. 45. Current can flow through the metal sheet 1, the auxiliary contact 12, and the metal sheet 2 to the lower electrode, and perform the welding.

Hot air warming facilitates also roller seam-welding without stripping the coating layers from the sheet metal. In FIGS. 46, 47 an upper and a lower welding roller 86 are illustrated, each of which comprises two roller discs 87 and an interposed contact cutter disc 88 of slightly larger disameter. The cutter disc is mounted by means of a resilient flanged sleeve 89 on the same shaft as the roller discs 87. In order to allow the resilient sleeve to give way, the roller discs 87 are provided with internal recesses 92, and the shaft 90 is provided with a groove 91. The roller discs are attached readily exchangeably by means of pins 93. When the welding rollers are pressed-on, the cutter discs penetrate the uppermost coating layer 1a of the sheet metal panel 1 and the lowermost layer 3b of the sheet metal panel 3, and thus allow the flow of a current via the auxiliary contact 12. In order to facilitate the penetration, hot air is blown through an upper orifice 160 and a lower orifice 161 along the layers 1a and 3b, respectively, softening the same. These layers are covered on the left hand side and right hand side adjacent the welded seam by cooling ledges 162.

In further embodiments, instead of using contact cutter discs, press-in wires are placed on the coating layers, pressed down by the welding rollers through the coatin layer and are then interwelded with the metal sheets. FIGS. 48, 49 show an upper welding roller 164 mounted on a shaft 165, two superimposed sheet metal panels 1, 2, each coated with layers on both sides, and a lower welding roller 164 mounted on a shaft 165. Ahead of the welding rollers, press-in wires 166 are placed on the layers 1a, 1b, respectively. By an upper flow of hot air from a duct 167 and lower hot air flow from a duct 168 these layers are softened so that the wires 166 are passed across the layers, and are subsequently interwelded with the metal sheets 1 and 2, respectively. For this purpose, at the beginning of the weld seam on the left hand margins of the sheet metal panels the same are connected by an auxiliary contact 12. By the side of the welded seam, on the left and right as well as on top and on the bottom, there are placed square-profile tubes 169, which are water-cooled, and protect the layers from being damaged by excessive heating.

This method may also be performed with contact wires placed between the coated sheet metal panels, as shown in FIGS. 50, 51. For this purpose preferably wires of low melting point metal are connected to shunts 22, 23, namely the uppermost wire 170 and the middle wire 171 on the left hand side to a lower shunt 23, which leads through a regulating resistor 25 to the lower welding roller 164; and on the right hand side the middle wire 171 and the lower wire 172 are connected to an upper shunt 22, which leads through a regulator resistor 25 to the upper welding roller 164. An auxiliary contact, as in the preceding embodiment, is not necessary. The wires may be attached to the sheet metal panels by means of adhesive tapes. In order to prevent oxidation of the synthetic material, carbon dioxide is blown from orifices 173 under the welding rollers. Heating of the layers by hot air is not necessary, since the wires are heated by currents from the shunts.

It suffices for the interwelding of two sheet metal panels, each coated with layers on both sides, to arrange a single wire on the upper side, which wire is connected to the lower electrode, while the underside may remain without a wire and without stripping off a layer.

I claim:

1. A method for resistance welding of a first insulation-coated sheet metal to at least two other insulation-coated sheet metals, comprising:
   establishing a first welding electrode in direct engagement and electrical contact with said first sheet metal;
   spacing a second welding electrode from a second sheet metal with the insulation coating of said second sheet metal between said second sheet metal and said second welding electrode;
   maintaining said electrodes generally alligned with said sheet metals therebetween and insulated from each other;
   establishing a shunt with a resistor from said second electrode to a stripped area of said first sheet metal independently of said second sheet metal;
   effecting electrical contact between said sheet metals at a point spaced from said region to be welded and independently of said shunt;
   while maintaining the above steps, serially passing current from said second welding electrode through said shunt, through said first metal and to said first welding electrode with said second sheet metal being out of the series circuit, and thereby generating sufficient heat to melt said insulation on all sheet metals in the region to be welded between said electrodes; and
   subsequently applying pressure on said electrodes against said sheet metals so that said melted insulation is displaced in the region to be welded, electrical contact between said sheet metals is made, and welding is effected.

2. A method for resistance welding of a first insulation-coated sheet metal to at least two other insulation-coated sheet metals, comprising:
   establishing a first welding electrode in direct engagement and electrical contact with said first sheet metal;
   spacing a second welding electrode from a second sheet metal with the insulation coating of said second sheet metal between said second sheet metal and said second welding electrode;
   maintaining said electrodes generally alligned with said sheet metals therebetween and insulated from each other;
   establishing a shunt with a resistor from said second electrode to a stripped area of said first sheet metal independently of said second sheet metal;
   establishing a separate second shunt from said fist electrode to said second sheet metal independently of said first sheet metal and independently of said first mentioned shunt;
   while maintaining the above steps, serially passing current from said second welding electrode through said shunt, through said first sheet metal and to said first welding electrode with said second sheet metal being out of the series circuit; and thereby generating sufficient heat to melt said insulation on all sheet metals in the region to be welded between said electrodes; and
   subsequently applying pressure on said electrodes against said sheet metals so that said melted insulation is displaced in the region to be welded, electrical contact between said sheet metals is made, and welding is effected.

3. A method for resistance welding of a first insulation-coated sheet metal to at least one other insulation-coated sheet metal, comprising:

establishing a first welding electrode in direct engagement and electrical contact with said first sheet metal;

spacing a second welding electrode from a second sheet metal with the insulation coating of said second sheet metal and said second welding electrode;

maintaining said electrodes generally alligned with said sheet metals therebetween;

establishing a shunt from said second elctrode to a stripped area of said first sheet metal independently of said second sheet metal;

providing a third sheet metal between said first and second sheet metals, in electrical contact directly with said second sheet metal and insulated from said first sheet metal;

establishing a second shunt from one of said electrodes to said second sheet metal and a third shunt from the other of said electrodes to aid third sheet metal;

while maintaining the above steps, serially passing current from said second welding electrode through said shunt, through said first sheet metal and to said first welding electrode with said second sheet metal being out of the series circuit, and thereby generating sufficient heat to melt said insulation on all sheet metals in the region to be welded between said electrodes; and subsequently applying presssure on said electrodes against said sheet metals so that sid melted insulation is displaced in the region to be welded, electrical contact between said sheet metals is made, and welding is effected.

4. A method for resistance welding of a first insulation-coated sheet metal to at least one other insulation-coated sheet metal, comprising:

establishing a first welding electrode in direct engagement and electrical contact with said first sheet metal;

spacing a second welding electrode from a second sheet metal with the insulation coating of said second sheet metal between said second sheet metal and said second welding electrode;

maintaining said electrodes generally alligned with said sheet metals therebetween;

establishing a shunt from said second electrode to a stripped area of said first sheet metal independently of said second sheet metal, including connecting an electrical conductor directly from said second electrode to a contact tube surrounding and out of electrical contact with said first electrode and applying said contact tube to a stripped area of said first sheet metal around said first electrode;

while maintaining the above steps, serially passing current from said second welding electrode through said shunt, through said first sheet metal and to said first welding electrode with said second sheet metal being out of the series circuit, and thereby generating sufficient heat to melt said insulation on all sheet metals in the region to be welded between said electrodes; and subsequently applying pressure on said electrodes against said sheet metals so that said melted insulation is displaced in the region to be welded, electrical contact between said sheet metals is made, and welding is effected.

5. A method for resistance welding of a first insulation-coated sheet metal to at least one other insulation-coated sheet metal, comprising:

establishing a first welding electrode in direct engagement and electrical contact with said first sheet metal;

establishing a second welding electrode in direct engagement and electrical contact with a second sheet metal;

surrounding said first and second welding electrodes with first and second contacting tubes, respectively, with each contacting tube being spaced from and electrically insulated from its welding electrode;

engaging said first contacting tube with said first sheet metal to establish electrical contact around and spaced from the electrical contact of said first welding electrode;

engaging said second contacting tube with said second sheet metal to establish electrical contact around and spaced from the electrical contact of said second welding electrode;

electrically interconnecting said first and second contacting tubes with a separate conductor independently of said electrodes and said sheet metal;

simultaneously with all of said steps, serially passing current from said first welding electrode, through said first sheet metal, through said first contacting tube, through said separate conductor, through said second contacting tube, through said second sheet metal, and to said second welding electrode to thereby generate sufficient heat to melt said insulation on all sheet metals in the region to be welded; and subsequently applying pressure on said electrodes againast said sheet metals so that said melted insulation is displaced in the region to be welded, electrical contact between said sheet metals is made, and welding is effected.

* * * * *